United States Patent
Abdelghaffar et al.

(10) Patent No.: US 12,432,692 B2
(45) Date of Patent: Sep. 30, 2025

(54) BEAM IDENTIFICATION FOR PAGING MESSAGES ON A SINGLE FREQUENCY NETWORK

(71) Applicant: QUALCOMM Incorporated, San Diego, CA (US)

(72) Inventors: Muhammad Sayed Khairy Abdelghaffar, San Jose, CA (US); Huilin Xu, Temecula, CA (US); Yan Zhou, San Diego, CA (US); Mostafa Khoshnevisan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 440 days.

(21) Appl. No.: 18/045,088

(22) Filed: Oct. 7, 2022

(65) Prior Publication Data
US 2023/0110962 A1 Apr. 13, 2023

Related U.S. Application Data

(60) Provisional application No. 63/254,406, filed on Oct. 11, 2021.

(51) Int. Cl.
*H04W 68/02* (2009.01)
*H04L 27/26* (2006.01)
*H04W 56/00* (2009.01)

(52) U.S. Cl.
CPC ......... *H04W 68/02* (2013.01); *H04L 27/2656* (2013.01); *H04W 56/001* (2013.01)

(58) Field of Classification Search
CPC .... H04B 7/086; H04L 27/2656; H04W 48/12; H04W 56/001; H04W 56/0015;
(Continued)

(56) References Cited

U.S. PATENT DOCUMENTS

2023/0062459 A1* 3/2023 Abdelghaffar ....... H04B 7/0408

FOREIGN PATENT DOCUMENTS

WO WO-2021189337 A1 9/2021
WO WO-2021197474 A1 10/2021

OTHER PUBLICATIONS

International Search Report and Written Opinion—PCT/US2022/046153—ISA/EPO—Jan. 20, 2023 (2108556WO).
(Continued)

*Primary Examiner* — Nader Bolourchi
(74) *Attorney, Agent, or Firm* — Holland & Hart LLP

(57) ABSTRACT

Methods, systems, and devices for wireless communication are described to support indication of a single frequency network (SFN) mode and associated parameters to a user equipment (UE), while the UE is operating in an idle mode. While operating in the idle mode, the UE may receive signaling from a transmission reception points (TRP), indicating that an SFN will be used for broadcast signaling received concurrently from multiple TRPs. Based on receiving the indication of the SFN, the UE may receive the broadcast signaling via a downlink control channel. For example, the UE may receive the broadcast signaling concurrently from a first TRP via a first beam and from a second TRP via a second beam, where the first and second beams may each be associated with a respective synchronization signal block (SSB).

30 Claims, 17 Drawing Sheets

(58) Field of Classification Search
CPC ... H04W 68/02; H04W 68/025; H04W 76/27; H04W 76/40
See application file for complete search history.

(56) References Cited

OTHER PUBLICATIONS

LG Electronics: "Enhancements on HST-SFN Deployment", 3GPP TSG RAN WG1 #103-e, R1-2008577, 3rd Generation Partnership Project, Mobile Competence Centre, 650, Route Des Lucioles, F-06921 Sophia-Antipolis Cedex, France, vol. RAN WG1, No. e-Meeting, Oct. 26-Nov. 13, 2020, Oct. 24, 2020, XP051946692, pp. 1-7, pp. 1, 3.
Nokia, et al., "Enhancements on Beam Management for Multi-TRP/Panel Transmission", 3GPP TSG RAN WG1 #104-bis-e, R1-2103368, 3rd Generation Partnership Project, Mobile Competence Centre, 650, Route Des Lucioles, F-06921 Sophia-Antipolis Cedex, France, vol. RAN WG1, No. e-Meeting, Apr. 12-Apr. 20, 2021, Apr. 6, 2020, XP051993393, sections 1, 3, 15 Pages, the whole document, pp. 7 ,3.
Qualcomm Incorporated: "Enhancements on HST-SFN deployment", 3GPP TSG-RAN WG1 Meeting #106bis-e, R1-2110169, 3rd Generation Partnership Project, Mobile Competence Centre, 650, Route Des Lucioles, F-06921 Sophia-Antipolis Cedex, France, e-Meeting, Oct. 11-Oct. 19, 2021, Oct. 2, 2021, 24 Pages, XP052059105, The Whole Document, pp. 5, 15, figures 4-1.
Vivo: "Further Discussion and Evaluation on HST-SFN Transmission Schemes", 3GPP TSG RAN WG1 #105-e, R1-2104346, 3rd Generation Partnership Project, Mobile Competence Centre, 650, Route Des Lucioles, F-06921 Sophia-Antipolis Cedex, France, vol. RAN WG1, No. e-Meeting, May 10-May 27, 2021, May 11, 2021, XP052006100, figures 2, 3, 15 Pages.

* cited by examiner

BEAM IDENTIFICATION FOR PAGING MESSAGES ON A SINGLE FREQUENCY NETWORK

CROSS REFERENCE

The present application for patent claims the benefit of U.S. Provisional Patent Application No. 63/254,406 by ABDELGHAFFAR et al., entitled "BEAM IDENTIFICATION FOR PAGING MESSAGES ON A SINGLE FREQUENCY NETWORK," filed Oct. 11, 2021, assigned to the assignee hereof, and expressly incorporated by reference herein.

FIELD OF TECHNOLOGY

The following relates to wireless communication, including beam identification for paging messages on a single frequency network (SFN).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may operate in an idle mode, where the UE may monitor for periodic communications from the network.

SUMMARY

The described techniques relate to improved methods, systems, devices, and apparatuses that support beam identification for paging messages on a single frequency network (SFN). Generally, the described techniques provide for indicating an SFN mode and associated parameters to a user equipment (UE), while the UE is operating in an idle mode. For example, while operating in the idle mode, the UE may receive signaling from one or more transmission reception points (TRPs), indicating that an SFN will be used for broadcast signaling (e.g., downlink transmissions associated with paging, system information, synchronization information) received concurrently from multiple TRPs. Based on receiving the indication of the SFN, the UE may receive the broadcast signaling via a downlink control channel. For example, the UE may receive the broadcast signaling concurrently from a first TRP via a first beam and from a second TRP via a second beam, where the first and second beams may each be associated with a respective synchronization signal block (SSB). In some cases, the downlink control channel may additionally indicate one or more sets of reference signals associated with the first TRP, the second TRP, or both, where the one or more sets of reference signals may also be associated with the SFN mode.

A method for wireless communication at a UE is described. The method may include receiving, in an idle mode, signaling indicating that an SFN will be used for broadcast signaling received concurrently from a set of multiple TRPs, the set of multiple TRPs including a first TRP and a second TRP and receiving, in the idle mode and via the SFN, the broadcast signaling via a downlink control channel, the broadcast signaling received from the first TRP via a first beam associated with a first SSB and from the second TRP via a second beam associated with a second SSB.

An apparatus for wireless communication at a UE is described. The apparatus may include a processor, memory coupled with the processor, and instructions stored in the memory. The instructions may be executable by the processor to cause the apparatus to receive, in an idle mode, signaling indicating that an SFN will be used for broadcast signaling received concurrently from a set of multiple TRPs, the set of multiple TRPs including a first TRP and a second TRP and receive, in the idle mode and via the SFN, the broadcast signaling via a downlink control channel, the broadcast signaling received from the first TRP via a first beam associated with a first SSB and from the second TRP via a second beam associated with a second SSB.

Another apparatus for wireless communication at a UE is described. The apparatus may include means for receiving, in an idle mode, signaling indicating that an SFN will be used for broadcast signaling received concurrently from a set of multiple TRPs, the set of multiple TRPs including a first TRP and a second TRP and means for receiving, in the idle mode and via the SFN, the broadcast signaling via a downlink control channel, the broadcast signaling received from the first TRP via a first beam associated with a first SSB and from the second TRP via a second beam associated with a second SSB.

A non-transitory computer-readable medium storing code for wireless communication at a UE is described. The code may include instructions executable by a processor to receive, in an idle mode, signaling indicating that an SFN will be used for broadcast signaling received concurrently from a set of multiple TRPs, the set of multiple TRPs including a first TRP and a second TRP and receive, in the idle mode and via the SFN, the broadcast signaling via a downlink control channel, the broadcast signaling received from the first TRP via a first beam associated with a first SSB and from the second TRP via a second beam associated with a second SSB.

Some examples of the method, apparatuses, and non-transitory computer-readable medium described herein may further include operations, features, means, or instructions for receiving, in the idle mode and via the SFN, the broadcast signaling via a downlink shared channel that may be scheduled by the downlink control channel, the broadcast signaling via the downlink shared channel received from the first TRP via the first beam and from the second TRP via the second beam.

Some examples of the method, apparatuses, and non-transitory computer-readable medium described herein may further include operations, features, means, or instructions for receiving signaling indicating that the first SSB may be associated with the first TRP and that the second SSB may be associated with the second TRP for the broadcast signaling, where receiving the downlink control channel from the first TRP via the first beam and from the second TRP via the second beam may be based on the indication of the first SSB and the second SSB.

In some examples of the method, apparatuses, and non-transitory computer-readable medium described herein, the signaling indicates that the first SSB and the second SSB may be associated with a control resource set for the broadcast signaling, a search space set for the broadcast signaling, or a monitoring opportunity for the broadcast signaling.

Some examples of the method, apparatuses, and non-transitory computer-readable medium described herein may further include operations, features, means, or instructions for identifying that the first SSB may be associated with the first TRP and that the second SSB may be associated with the second TRP for the broadcast signaling based on a mapping rule, where receiving the downlink control channel from the first TRP via the first beam and from the second TRP via the second beam may be based on the identifying.

Some examples of the method, apparatuses, and non-transitory computer-readable medium described herein may further include operations, features, means, or instructions for receiving a system information block (SIB) transmission indicating the mapping rule.

In some examples of the method, apparatuses, and non-transitory computer-readable medium described herein, the mapping rule associates each of a set of one or more monitoring opportunities for the broadcast signaling with a respective pair of SSBs or with a respective SSB.

In some examples of the method, apparatuses, and non-transitory computer-readable medium described herein, each respective pair of SSBs includes two SSB s having consecutive index numbers, each respective pair of SSBs includes two SSBs having index numbers that may be offset by two, each respective pair of SSBs includes two SSBs having index numbers that may be offset by a quantity equal to half of a total quantity of index numbers, and each respective pair of SSBs includes two SSBs on different cells that may have a same index number.

In some examples of the method, apparatuses, and non-transitory computer-readable medium described herein, one pair of SSBs may be mapped to each of the set of one or more monitoring opportunities, one pair of SSBs may be mapped to each monitoring opportunity in a subset of the set of one or more monitoring opportunities, and one pair of SSBs may be mapped to one monitoring opportunity of the set of one or more monitoring opportunities.

Some examples of the method, apparatuses, and non-transitory computer-readable medium described herein may further include operations, features, means, or instructions for transmitting signaling indicating a capability of the UE to use the SFN to receive the broadcast signaling concurrently from the set of multiple TRPs, where receiving the signaling that indicates to use the SFN may be based on transmitting the signaling indicating the capability of the UE.

In some examples of the method, apparatuses, and non-transitory computer-readable medium described herein, receiving the downlink control channel for the broadcast signaling may include operations, features, means, or instructions for receiving, via the downlink control channel, an indication of a first set of one or more reference signal occasions associated with the first TRP and a second set of one or more reference signal occasions associated with the second TRP.

In some examples of the method, apparatuses, and non-transitory computer-readable medium described herein, the first set of one or more reference signal occasions may be quasi co-located (QCLed) with the first SSB based on being associated with the first TRP and the second set of one or more reference signal occasions may be QCLed with the second SSB based on being associated with the second TRP.

In some examples of the method, apparatuses, and non-transitory computer-readable medium described herein, receiving the downlink control channel for the broadcast signaling may include operations, features, means, or instructions for receiving, via the downlink control channel, an indication of a set of one or more reference signal occasions associated with the first TRP, where the first TRP may be an anchor TRP.

In some examples of the method, apparatuses, and non-transitory computer-readable medium described herein, the set of one or more reference signal occasions may be QCLed with the first SSB based on being associated with the first TRP or based on the downlink control channel indicating that the set of one or more reference signal occasions may be QCLed with the first SSB.

In some examples of the method, apparatuses, and non-transitory computer-readable medium described herein, the downlink control channel includes a paging indication, a paging early indication, a system information indication, a random access indication, or any combination thereof.

In some examples of the method, apparatuses, and non-transitory computer-readable medium described herein, a downlink shared channel scheduled by the downlink control channel includes a paging message, a SIB, other system information, a random access message, or any combination thereof.

In some examples of the method, apparatuses, and non-transitory computer-readable medium described herein, the idle mode includes a radio resource control (RRC) idle mode or an RRC inactive mode.

In some examples of the method, apparatuses, and non-transitory computer-readable medium described herein, the first SSB may be associated with a first cell and the second SSB may be associated with a second cell.

A method for wireless communication at a first TRP is described. The method may include transmitting, to a UE in an idle mode, signaling indicating that an SFN will be used for broadcast signaling received concurrently from a set of multiple TRPs, the set of multiple TRPs including the first TRP and a second TRP and transmitting, to the UE in the idle mode and via the SFN, the broadcast signaling via a downlink control channel, the broadcast signaling transmitted via a first beam associated with a first SSB and transmitted concurrently with a transmission of the downlink control channel from the second TRP via a second beam associated with a second SSB.

An apparatus for wireless communication at a first TRP is described. The apparatus may include a processor, memory coupled with the processor, and instructions stored in the memory. The instructions may be executable by the processor to cause the apparatus to transmit, to a UE in an idle mode, signaling indicating that an SFN will be used for broadcast signaling received concurrently from a set of multiple TRPs, the set of multiple TRPs including the first TRP and a second TRP and transmit, to the UE in the idle mode and via the SFN, the broadcast signaling via a downlink control channel, the broadcast signaling transmitted via a first beam associated with a first SSB and transmitted concurrently with a transmission of the downlink control channel from the second TRP via a second beam associated with a second SSB.

Another apparatus for wireless communication at a first TRP is described. The apparatus may include means for transmitting, to a UE in an idle mode, signaling indicating that an SFN will be used for broadcast signaling received concurrently from a set of multiple TRPs, the set of multiple TRPs including the first TRP and a second TRP and means for transmitting, to the UE in the idle mode and via the SFN, the broadcast signaling via a downlink control channel, the broadcast signaling transmitted via a first beam associated with a first SSB and transmitted concurrently with a transmission of the downlink control channel from the second TRP via a second beam associated with a second SSB.

A non-transitory computer-readable medium storing code for wireless communication at a first TRP is described. The code may include instructions executable by a processor to transmit, to a UE in an idle mode, signaling indicating that an SFN will be used for broadcast signaling received concurrently from a set of multiple TRPs, the set of multiple TRPs including the first TRP and a second TRP and transmit, to the UE in the idle mode and via the SFN, the broadcast signaling via a downlink control channel, the broadcast signaling transmitted via a first beam associated with a first SSB and transmitted concurrently with a transmission of the downlink control channel from the second TRP via a second beam associated with a second SSB.

Some examples of the method, apparatuses, and non-transitory computer-readable medium described herein may further include operations, features, means, or instructions for transmitting, to the UE in the idle mode and via the SFN, the broadcast signaling via a downlink shared channel that may be scheduled by the downlink control channel, the broadcast signaling via the downlink shared channel transmitted from the first TRP via the first beam and transmitted concurrently with a transmission of the downlink shared channel from the second TRP via the second beam.

Some examples of the method, apparatuses, and non-transitory computer-readable medium described herein may further include operations, features, means, or instructions for transmitting signaling indicating that the first SSB may be associated with the first TRP and that the second SSB may be associated with the second TRP for the broadcast signaling, where transmitting the downlink control channel via the first beam may be based on the indication of the first SSB and the second SSB.

In some examples of the method, apparatuses, and non-transitory computer-readable medium described herein, the signaling indicates that the first SSB and the second SSB may be associated with a control resource set for the broadcast signaling, a search space set for the broadcast signaling, or a monitoring opportunity for the broadcast signaling.

Some examples of the method, apparatuses, and non-transitory computer-readable medium described herein may further include operations, features, means, or instructions for identifying that the first SSB may be associated with the first TRP and that the second SSB may be associated with the second TRP for the broadcast signaling based on a mapping rule, where transmitting the downlink control channel via the first beam may be based on the identifying.

Some examples of the method, apparatuses, and non-transitory computer-readable medium described herein may further include operations, features, means, or instructions for transmitting a SIB transmission indicating the mapping rule.

In some examples of the method, apparatuses, and non-transitory computer-readable medium described herein, the mapping rule associates each of a set of one or more monitoring opportunities for the broadcast signaling with a respective pair of SSBs or with a respective SSB.

In some examples of the method, apparatuses, and non-transitory computer-readable medium described herein, each respective pair of SSBs includes two SSBs having consecutive index numbers, each respective pair of SSBs includes two SSBs having index numbers that may be offset by two, each respective pair of SSBs includes two SSBs having index numbers that may be offset by a quantity equal to half of a total quantity of index numbers, and each respective pair of SSBs includes two SSBs on different cells that may have a same index number.

In some examples of the method, apparatuses, and non-transitory computer-readable medium described herein, one pair of SSBs may be mapped to each of the set of one or more monitoring opportunities, one pair of SSBs may be mapped to each monitoring opportunity in a subset of the set of one or more monitoring opportunities, and one pair of SSB s may be mapped to one monitoring opportunity of the set of one or more monitoring opportunities.

Some examples of the method, apparatuses, and non-transitory computer-readable medium described herein may further include operations, features, means, or instructions for receiving signaling indicating a capability of the UE to use the SFN to receive the broadcast signaling concurrently from the set of multiple TRPs, where transmitting the signaling that indicates to use the SFN may be based on receiving the signaling indicating the capability of the UE.

In some examples of the method, apparatuses, and non-transitory computer-readable medium described herein, transmitting the downlink control channel for the broadcast signaling may include operations, features, means, or instructions for transmitting, via the downlink control channel, an indication of a first set of one or more reference signal occasions associated with the first TRP and a second set of one or more reference signal occasions associated with the second TRP.

In some examples of the method, apparatuses, and non-transitory computer-readable medium described herein, the first set of one or more reference signal occasions may be QCLed with the first SSB based on being associated with the first TRP and the second set of one or more reference signal occasions may be QCLed with the second SSB based on being associated with the second TRP.

In some examples of the method, apparatuses, and non-transitory computer-readable medium described herein, transmitting the downlink control channel for the broadcast signaling may include operations, features, means, or instructions for transmitting, via the downlink control channel, an indication of a set of one or more reference signal occasions associated with the first TRP, where the first TRP may be an anchor TRP.

In some examples of the method, apparatuses, and non-transitory computer-readable medium described herein, the set of one or more reference signal occasions may be QCLed with the first SSB based on being associated with the first TRP or based on the downlink control channel indicating that the set of one or more reference signal occasions may be QCLed with the first SSB.

In some examples of the method, apparatuses, and non-transitory computer-readable medium described herein, the downlink control channel includes a paging indication, a paging early indication, a system information indication, a random access indication, or any combination thereof.

In some examples of the method, apparatuses, and non-transitory computer-readable medium described herein, a downlink shared channel scheduled by the downlink control channel includes a paging message, a SIB, other system information, a random access message, or any combination thereof.

In some examples of the method, apparatuses, and non-transitory computer-readable medium described herein, the idle mode includes an RRC idle mode or an RRC inactive mode.

In some examples of the method, apparatuses, and non-transitory computer-readable medium described herein, the first SSB may be associated with a first cell and the second SSB may be associated with a second cell.

DETAILED DESCRIPTION

A user equipment (UE) may operate in a single frequency network (SFN) mode when communicating with multiple transmission reception points (TRPs). In the SFN mode, the UE may concurrently receive a same communication (e.g., a downlink control channel or shared channel transmission) from the multiple TRPs via same time and frequency resources (e.g., via the SFN). In some cases, the UE may also operate in an idle mode, and may receive paging messages (e.g., and associated control channel transmissions) from the multiple TRPs in the SFN mode. However, because the UE is in the idle mode, the UE may be unaware of one or more communication parameters of the SFN transmissions, such as a beam or other parameter corresponding to a synchronization signal block (SSB) associated with a respective TRP. In some cases, the UE may even be unaware of whether the SFN transmissions are received from one TRP or from multiple TRPs.

The present disclosure provides techniques for indicating an SFN mode and associated parameters to a UE, while the UE is operating in an idle mode. For example, while operating in the idle mode, the UE may receive signaling from one or more TRPs, indicating that an SFN will be used for broadcast signaling (e.g., downlink transmissions associated with paging, system information, synchronization information) received concurrently from multiple TRPs. While the examples herein describe two TRPs, it is to be understood that the same examples may be extended to any quantity of TRPs operating in an SFN mode with the UE.

Based on receiving the indication of the SFN, the UE may receive the broadcast signaling via a downlink control channel. For example, the UE may receive the broadcast signaling concurrently from a first TRP via a first beam and from a second TRP via a second beam, where the first and second beams may each be associated with a respective SSB. The UE may additionally or alternatively receive the broadcast signaling via a downlink shared channel that is scheduled by the downlink control channel. In some examples, signaling from one or more of the TRPs may indicate the respective SSBs to the UE. In some examples, the UE may identify the respective SSBs based on a mapping rule that may associate a monitoring occasion with a pair of SSBs or with one SSB. In some cases, the downlink control channel may additionally indicate one or more sets of reference signals associated with the first TRP, the second TRP, or both, where the one or more sets of reference signals may also be associated with the SFN mode.

Aspects of the disclosure are initially described in the context of wireless communications systems. Aspects of the disclosure are further illustrated by and described with reference to a process flow, apparatus diagrams, system diagrams, and flowcharts that relate to beam identification for paging messages on an SFN.

Figure 1:
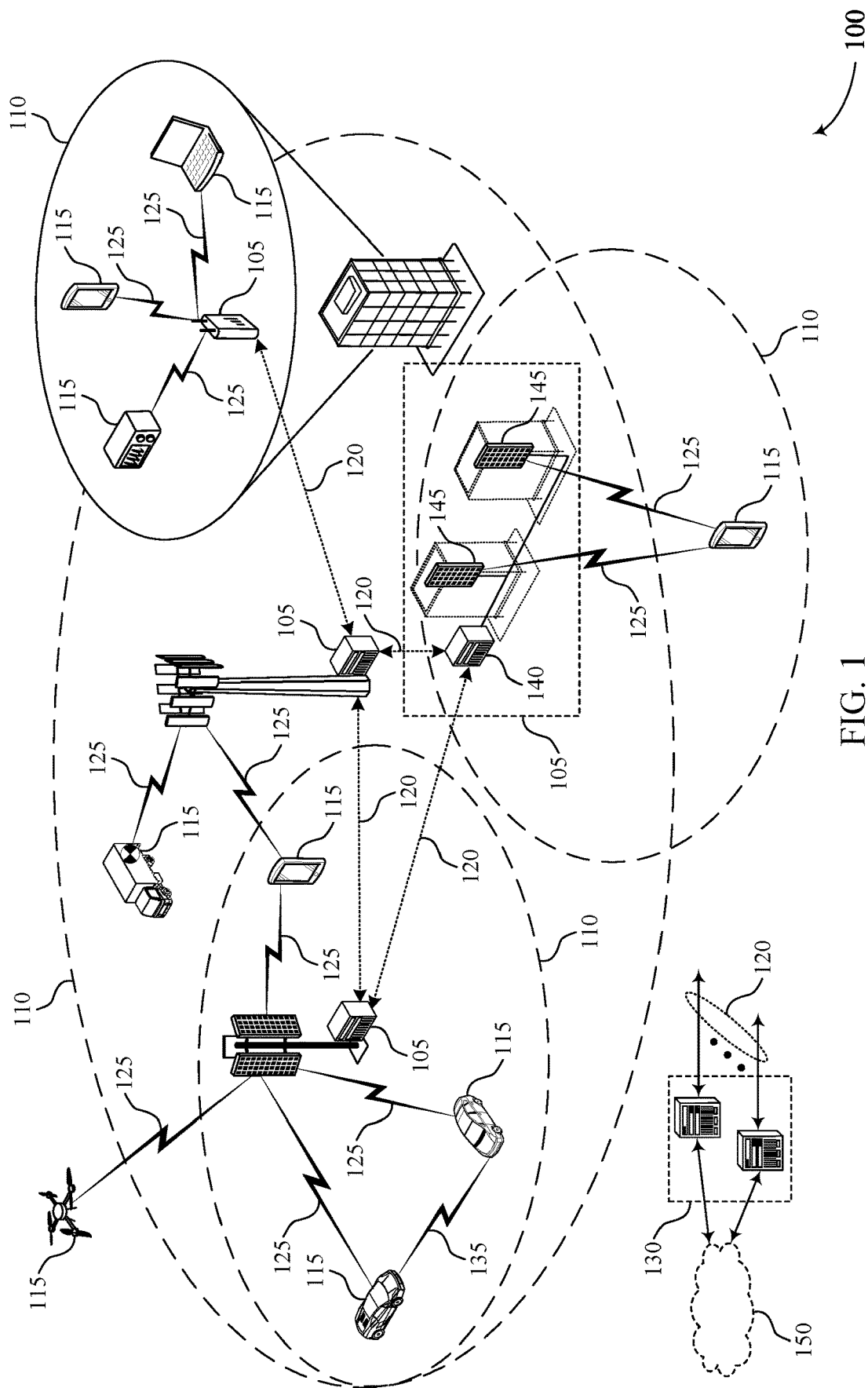
FIG. 1 illustrates an example of a wireless communications system that supports beam identification for paging messages on a single frequency network (SFN) in accordance with aspects of the present disclosure.

FIG. 1 illustrates an example of a wireless communications system 100 that supports beam identification for paging messages on an SFN in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

While operating in the idle mode, a UE 115 may receive signaling from one or more TRPs, indicating that an SFN will be used for broadcast signaling (e.g., downlink transmissions associated with paging, system information, synchronization information) received concurrently from multiple TRPs. Based on receiving the indication of the SFN, the UE 115 may receive the broadcast signaling over a downlink control channel. The UE 115 may additionally or alternatively receive the broadcast signaling over a downlink shared channel that is scheduled by the downlink control channel. In some cases, the downlink control channel may additionally indicate one or more sets of reference signals associated with the first TRP, the second TRP, or both, where the one or more sets of reference signals may also be associated with the SFN mode.

Figure 2:
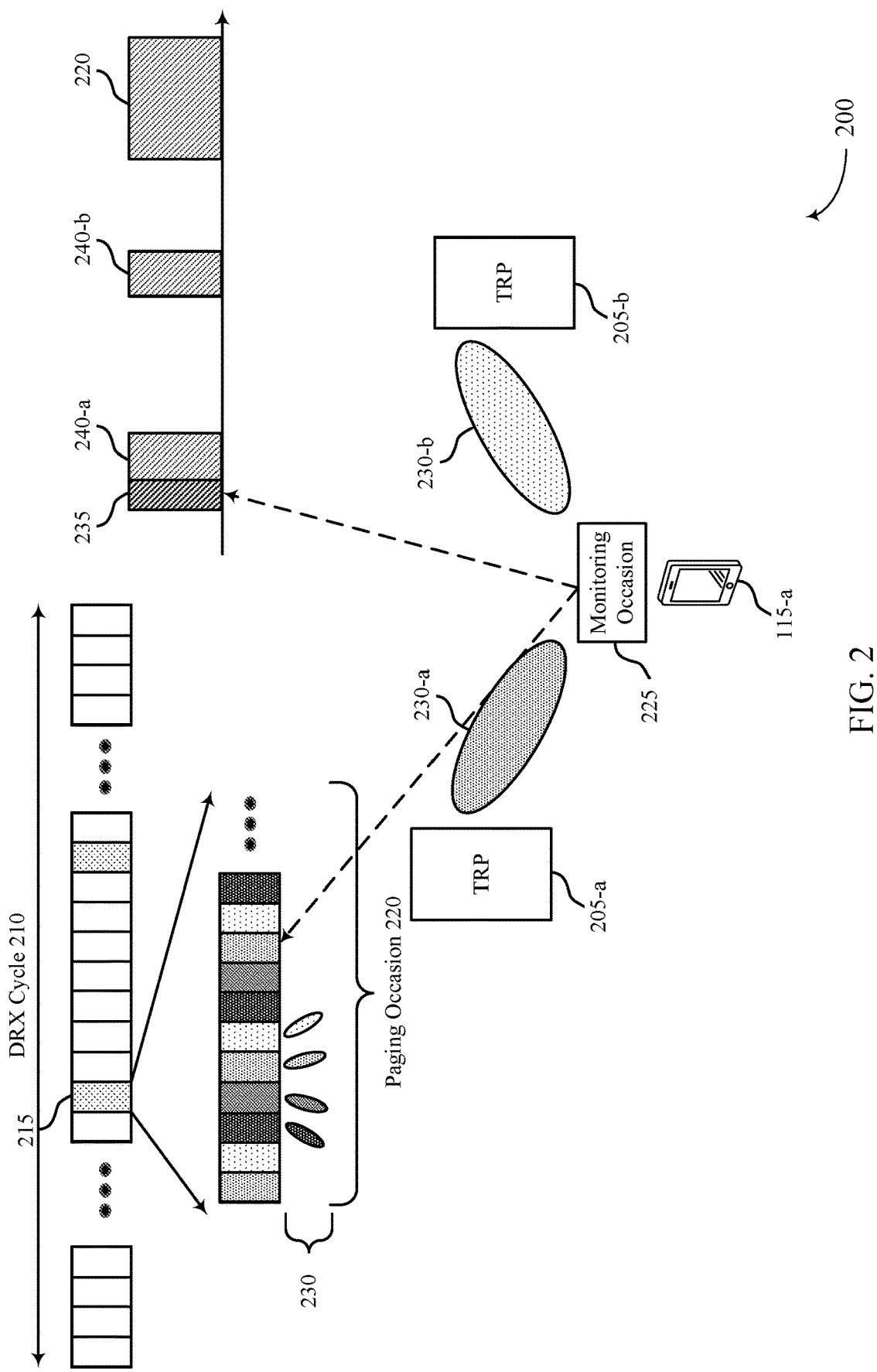
FIG. 2 illustrates an example of a wireless communications system that supports beam identification for paging messages on an SFN in accordance with aspects of the present disclosure.

FIG. 2 illustrates an example of a wireless communications system 200 that supports beam identification for paging messages on an SFN in accordance with aspects of the present disclosure. In some examples, wireless communications system 200 may implement or be implemented by one or more aspects of wireless communications system 100. For example, wireless communications system 200 may include a UE 115-*a* and TRPs 205-*a* and 205-*b*, where UE 115-*a* may represent a UE 115 described with reference to FIG. 1. As described herein, a TRP may represent a base station 105 or a component thereof, where the base station 105 may represent an example of a base station 105 described with reference to FIG. 1. As such, TRPs 205-*a* and 205-*b* may correspond to different base stations 105, or to the same base station 105. In some cases, UE 115-*a* may operate in an idle mode (e.g., an RRC idle or an RRC inactive mode) with TRPs 205-*a* and 205-*b*.

In the idle mode, UE 115-*a* may monitor for (e.g., listen for) a paging message, where the network may use the paging messages to initiate a mobile terminated connection. In some cases, a paging message may be a paging "short message" for UE 115-*a*, which may be received when UE 115-*a* is in RRC connected, RRC idle, or an RRC inactive mode. The short message may be included in a payload of a downlink control information (DCI) (e.g., DCI format 1_0), with a paging radio network temporary identifier (P-RNTI). The short message may indicate that system information has changes, and therefore needs to be reacquired, or that there is an incoming earthquake and tsunami warning system (ETWS) message or commercial mobile alert system (CMAS) message.

UE 115-*a* may monitor for paging messages according to a configured periodicity (e.g., a periodicity T), which may additionally or alternatively be referred to as a paging cycle. The periodicity may be derived by UE 115-*a* based on a default paging cycle for a cell communicating with UE 115-*a*, based on a UE-specific configuration of a discontinuous reception (DRX) cycle 210 for UE 115-*a*, or based on an extended DRX (eDRX) cycle configuration for UE 115-*a*. In some examples, a value of the configured periodicity (e.g., T) may be 640 ms, 1280 ms, 2560 ms, or 5120 ms.

A paging frame 215 may represent a radio frame that includes one or more paging occasions 220, where the network may configure a quantity (e.g., N) of paging frames 215 per paging cycle and a start offset for a starting location of a first paging frame 215 within a paging cycle. The one or more paging occasions 220 within a paging frame 215 may each represent a set of downlink control channel monitoring occasions 225 (e.g., physical downlink control channel (PDCCH) monitoring occasions). A paging occasion 220 may also include or span multiple time slots. The set of downlink control channel monitoring occasions 225 within a paging occasion 220 may be for all beams 230 via which a paging indication for UE 115-*a* is sent. Each downlink control channel monitoring occasion 225, for example, may be associated with a respective beam 230. In some examples, the downlink control channel monitoring occasions 225 within a paging occasion 220 may be configured over all SSB beams 230, and may repeat in time.

Each UE 115 (e.g., including UE 115-*a*) may be assigned to one paging occasion 220 within a paging cycle. Within each paging frame 215, a UE 115 (e.g., such as UE 115-*a*) may be randomly assigned to a paging occasion 220 by hashing an associated UE identifier (ID). For example, the UE identifier of UE 115-*a* may be hashed using an equation similar to equation (1):

$$i\_s = \text{floor}(UE\_ID/N) \bmod(Ns)$$

where i_s represents an index of a paging occasion 220 within a paging frame 215, floor represents a flooring operation, UE_ID represents the UE ID of UE 115-*a*, N represents the quantity of paging frames 215 per paging cycle, mod represents a modulo operation, and Ns represents a quantity of paging occasions 220 within a paging frame 215.

When multiple UEs 115 share a same paging occasion 220 (e.g., each of the multiple UEs 115 is associated with a respective downlink control channel monitoring occasion 225 within the paging occasion 220), the associated paging messages for the multiple UEs 115 may be multiplexed in a single downlink transmission (e.g., a single physical downlink shared channel (PDSCH)).

In some cases, a downlink control channel monitoring occasion 225 may additionally or alternatively be associated with a paging early indication 235 (e.g., the downlink control channel may include or carry the paging early indication 235), which may indicate whether UE 115-*a* is paged within an associated paging occasion 220 (e.g., a following paging occasion 220). Additionally, or alternatively, the downlink control channel may include or carry a paging indication, a system information indication, a random access indication, or any combination thereof. The downlink shared channel scheduled by the downlink control channel may accordingly include or carry a paging message, a SIB (e.g., SIB1), other system information, a random access message (e.g., message 2 (msg2) or message 4 (msg4)), or any combination thereof.

In a first example of a downlink control channel carrying the paging early indication 235, the paging early indication 235 may indicate whether any of the UEs 115 associated with the paging occasion 220 (e.g., including UE 115-*a*) are paged within the following paging occasion 220. In a second example, the UEs 115 associated with the paging occasion 220 may be split into groups or sub-groups, and the paging early indication 235 may be associated with a group or sub-group including UE 115-*a*. As such, the paging early indication 235 may indicate whether any of the UEs 115 within the same group or sub-group are paged within the following paging occasion 220.

If the paging early indication 235 for UE 115-*a* is not transmitted, UE 115-*a* may refrain from monitoring for one or more SSBs 240 following the paging early indication 235 (e.g., SSBs 240-*a* and 240-*b*, used for improving tracking loop accuracy for decoding a paging message). In such cases, UE 115-*a* may also refrain from monitoring a corresponding downlink control channel monitoring occasion 225 within the following paging occasion 220. Based on usage of the paging early indication, UE 115-*a* may, in some cases, refrain from attempting to decode paging messages associated with the paging occasion 220 (e.g., PDSCH messages), which may reduce decoding of paging messages not associated with UE 115-*a*. Reception of the paging early indication 235 may also reduce power consumption, for example, compared with decoding a downlink control channel scheduling a paging message (e.g., decoding a paging PDCCH).

In some cases, UE 115-*a* may communicate with the network (e.g., including receiving paging downlink control channels and paging messages) via multiple TRPs 205, such as via TRP 205-*a* and TRP 205-*b*. The TRPs 205, in some cases, may communicate with UE 115-*a* via an SFN transmission of a downlink control channel or downlink shared channel (e.g., SFN transmission of PDCCH/PDSCH). The downlink control channel and the downlink shared channel may both be transmitted using the SFN, or one of the downlink control channel or the downlink shared channel may be transmitted using the SFN (e.g., the PDCCH and PDSCH transmission mode may not be the same). In an SFN mode for the multiple TRPs 205, a same downlink control channel or downlink shared channel may be concurrently transmitted (e.g., at least partially overlapping in time) from the TRPs 205, using the same time and frequency resources. Using the SFN mode may increase downlink transmission reliability by increasing transmission diversity. For example, the SFN mode may be used to improve reliability in scenarios such as a high mobility scenario (e.g., on a high-speed train) or a signal blockage scenario, among other examples.

The SFN transmission scheme for the downlink control channel or downlink shared channel may be indicated to UE 115-*a* via signaling from one or both TRPs 205 (e.g., may be identified via an RRC or other higher layer parameter). The indication of the SFN transmission scheme may indicate, to UE 115-*a*, that the downlink control channel or the downlink shared channel is to be transmitted from the TRPs 205 in the SFN mode. For indication of transmission of the downlink control channel in the SFN mode, a control resource set (CORESET) may be activated with two transmission configuration indicator (TCI) states (e.g., by an activation command, such as a MAC control element (MAC-CE) activation command). For indication of transmission of the downlink shared channel in the SFN mode, a DCI format 1_1 and 1_2 may indicate (e.g., via a respective codepoint) two TCI states for the downlink shared channel.

In a first SFN mode (e.g., "sfnSchemeA"), a downlink control channel and associated demodulation reference signals (DMRS) may be transmitted in an SFN manner (e.g., a same PDCCH may be transmitted from each TRP 205 to increase transmission diversity). The DMRS of the downlink control channel may be associated with two TCI states to increase Doppler shift tracking and support multi-beam reception of the downlink control channel (e.g., to improve reliability). In the first SFN mode, the two TCI states may indicate that the downlink control channel and/or downlink shared channel is quasi co-located (QCLed) with an SSB via a quasi co-location (QCL) Type A and Type D. QCL Type A may associate a Doppler shift, a Doppler spread, a delay spread, and an average delay of two signals (e.g., the downlink channel and the SSB). QCL Type D may associate a receive beam of the two signals. In addition to QCL Type A and Type D, UE 115-*a* may also be configured, in some cases, with a QCL Type C, which may associate an average delay and a Doppler shift of the two signals.

In a second SFN mode (e.g., "sfnSchemeB"), UE 115-*a* may be configured to transmit sounding reference signals (SRS) prior to transmission of the downlink control channel. The TRPs 205 may use the SRS to align the frequency of the transmissions of the downlink control channel from the different TRPs 205 (e.g., to counter to a Doppler shift in the frequency of the downlink control channel transmission from one or more of the TRPs 205). For example, the downlink control channel may be transmitted in an SFN manner by TRPs 205-*a* and 205-*b*, and the downlink control channel transmission from TRP 205-*b* may be pre-compensated to align in frequency with the downlink control channel transmission from TRP 205-*a*, or vice versa. The DMRS of the downlink control channel may be associated with two TCI states to support multi-beam reception of the downlink control channel (e.g., to improve reliability).

An SFN CORESET for the downlink control channel may be associated with a common search space (e.g., shared by one or more types of DCI for a system information block (SIB), for other system information, or for paging). As described herein, this common search space may be associated with transmissions in an SFN mode. For example, one or more SSBs 240, downlink control channel transmissions, and/or downlink shared channel transmissions may be transmitted concurrently from the TRPs 205, using different beams (e.g., using a first beam 230-*a* for TRP 205-*a* and a second beam 230-*b* for TRP 205-*b*). The different beams may additionally each be associated with a respective SSB 240.

However, if UE 115-*a* is in an idle mode (e.g., RRC inactive or RRC idle mode), UE 115-*a* may be unaware of the configuration of the TRPs 205 for the SFN mode (e.g., for receiving a downlink transmission concurrently from the different TRPs 205). For example, UE 115-*a* may be unaware of whether to receive the downlink transmission (e.g., the downlink control channel or downlink shared channel) using one beam or two beams (e.g., whether the downlink control channel monitoring occasion 225 is associated with one SSB 240 or two SSBs 240), and may further be unaware of which beams to use for reception of the downlink transmission.

The present disclosure provides techniques for indicating an SFN mode and associated parameters for downlink reception from multiple TRPs 205 to UE 115-*a*, while UE 115-*a* is operating in an idle mode. For example, while operating in the idle mode, UE 115-*a* may receive signaling from TRP 205-*a*, TRP 205-*b*, or both, indicating that an SFN (e.g., "sfnSchemeA" or "sfnSchemeB") will be used for broadcast signaling (e.g., downlink transmissions associated with paging, system information, synchronization information) received concurrently from TRP 205-*a* and TRP 205-*b*. While the examples herein describe two TRPs 205, it is to be understood that the same examples may be extended to any quantity of TRPs 205 operating in an SFN mode with UE 115-*a*.

The indication to use the SFN for receiving the downlink transmission from the TRPs 205 may be based on a UE capability of UE 115-*a*. For example, UE 115-*a* may transmit its UE capability to TRP 205-*a*, TRP 205-*b*, or both. The UE capability may indicate a capability to receive a broadcast signaling downlink control channel or downlink shared channel in an SFN manner (e.g., in an idle mode). In some cases, UE 115-*a* may indicate that UE 115-*a* is incapable of receiving the broadcast signaling in an SFN manner. In some cases, UE 115-*a* may indicate that UE 115-*a* is capable of receiving the broadcast signaling in an SFN manner.

Based on receiving the indication of the SFN, UE 115-*a* may receive the broadcast signaling via a downlink control channel. For example, UE 115-*a* may receive the broadcast signaling concurrently from TRP 205-*a* via beam 230-*a* and from TRP 205-*b* via beam 230-*b*, where beam 230-*a* and beam 230-*b* may each be associated with a respective SSB 240. The DMRS of the downlink control channel, for example, may be QCLed (e.g., QCL Type A and Type D) with the SSBs 240. UE 115-*a* may additionally or alternatively receive the broadcast signaling via a downlink shared channel that is scheduled by the downlink control channel. For example, UE 115-*a* may receive the broadcast signaling concurrently from TRP 205-*a* via beam 230-*a* and from TRP 205-*b* via beam 230-*b*, where beam 230-*a* and beam 230-*b* may each be associated with a respective SSB 240.

In some examples, TRP 205-*a*, TRP 205-*b*, or both, may indicate the respective SSBs 240 to UE 115-*a*, such as via a SIB. For example, the SIB may indicate that a broadcast signaling CORESET, a broadcast signaling search space set, or a broadcast signaling monitoring occasion, is associated with a pair of SSBs 240 (e.g., SSBi, SSBj). In some examples, UE 115-*a* may identify the respective SSBs 240 based on a mapping rule, such as a mapping rule indicated by the TRPs 205 (e.g., via a SIB) or a defined mapping rule that is stored at UE 115-*a* (e.g., as defined by a wireless communications standard). The mapping rule may, for example, associate each TRP 205 with a respective SSB 240. In some cases, the SSBs 240 may be associated with different, respective cells.

In some cases (e.g., based on a capability of UE 115-*a*, based on a network configuration), UE 115-*a* may additionally or alternatively not expect that a downlink control channel candidate associated with broadcast signaling in a common search space (e.g., type2 common search space) with a P-RNTI to be associated with an SFN mode (e.g., to be associated with an SFN CORESET). In such cases, a downlink control channel monitoring occasion 225 may be associated with one SSB 240, and the downlink control channel (e.g., and associated downlink shared channel) may be QCLed with the one SSB 240. UE 115-*a* may therefore not expect to receive the downlink control channel (e.g., and associated downlink shared channel) from the TRPs 205 in the SFN mode.

In some cases, if the downlink control channel monitoring occasion 225 is associated with two or more SSBs 240, and UE 115-*a* does not support broadcast signaling reception in the SFN mode (e.g., where the downlink control channel or downlink shared channel, or both, is QCLed with a respective SSB 240 from each of the TRPs 205), UE 115-*a* may receive the broadcast signaling from one TRP 205. For example, UE 115-*a* may assume that the broadcast signaling is to be received from TRP 205-*a* or TRP 205-*b*, where the broadcast signaling may be QCLed with the respective SSB 240 for TRP 205-*a* or TRP 205-*b*. In such cases, the SSB 240 may be identified by UE 115-*a* using a rule (e.g., using a defined rule) to identify whether to use the SSB 240 associated with TRP 205-*a* or TRP 205-*b*.

Figure 3:
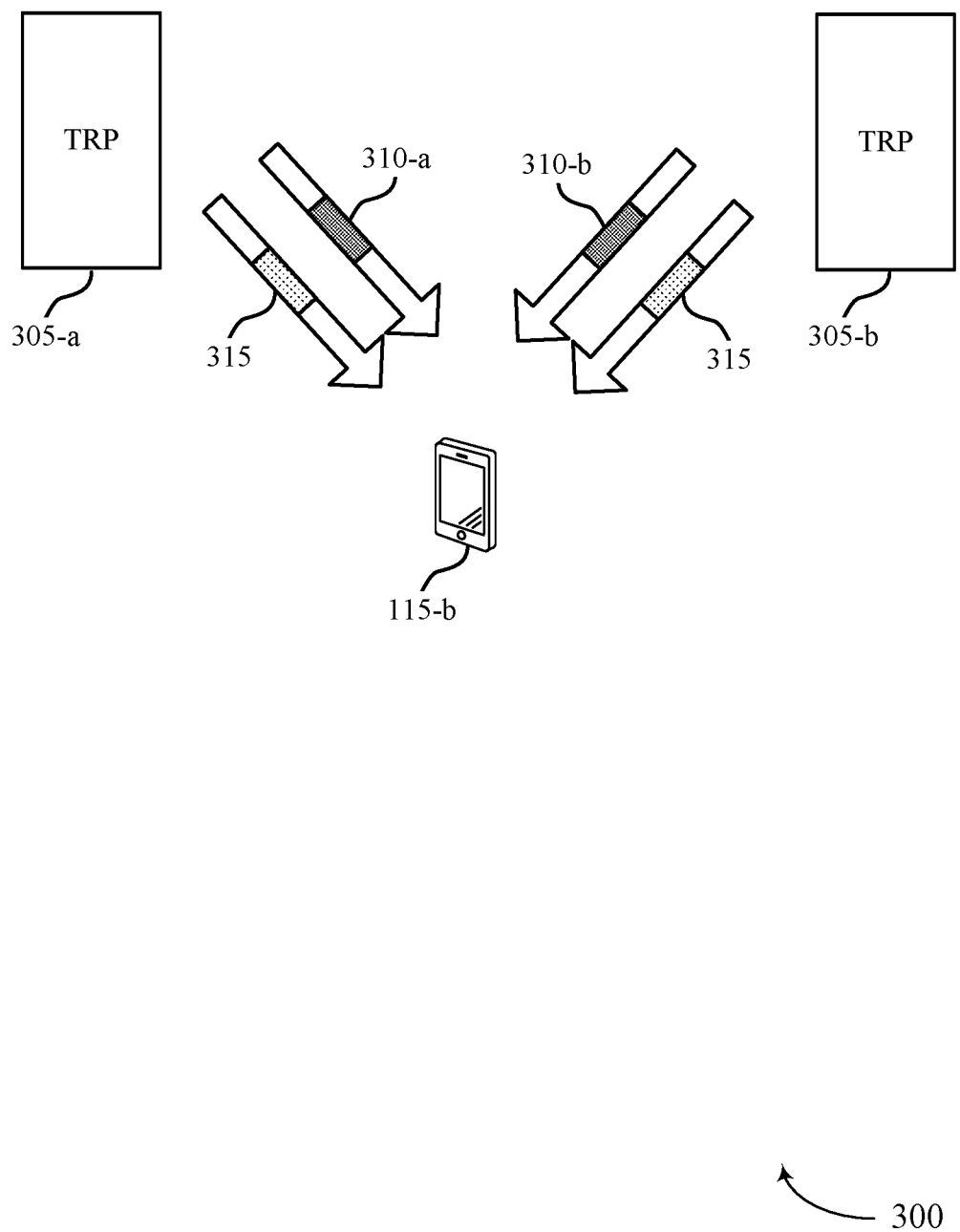
FIG. 3 illustrates an example of a wireless communications system that supports beam identification for paging messages on an SFN in accordance with aspects of the present disclosure.

FIG. 3 illustrates an example of a wireless communications system 300 that supports beam identification for paging messages on an SFN in accordance with aspects of the present disclosure. In some examples, wireless communications system 300 may implement or be implemented by wireless communications system 100 or 200. For example, wireless communications system 300 may include a UE 115-*b* and TRPs 305-*a* and 305-*b*, which may be examples of a UE 115 and TRPs described with reference to FIGS. 1 and 2.

UE 115-*b* may operate in an idle mode (e.g., an RRC inactive or RRC idle mode) with the network. When operating in the idle mode, UE 115-*b* may be configured with tracking reference signals (TRS) 310 (e.g., configured to receive TRS) for tracking loop updates. If the TRS 310 are configured for another, connected mode UE 115 (e.g., there are not dedicated TRS for idle UEs 115) there may be no additional network overhead or consumption associated with the TRS 310. UE 115-*b* may experience an increased power saving from an increased density of reference signal opportunities for tracking loop updates (e.g., TRS, channel state information reference signals (CSI-RS), SSB) based on the configured TRS 310. As such, UE 115-*b* may have a longer idle time (e.g., longer deep sleep time). For example, if a TRS 310 with a 20 ms periodicity is configured, on average a combined periodicity for SSB and TRS 310 may be 10 ms.

As described with reference to FIG. 2, UE 115-*b* may receive one or more downlink transmissions (e.g., a downlink control channel 315 and/or a downlink shared channel) in an idle mode and via an SFN from multiple TRPs 305, such as TRP 305-*a* and TRP 305-*b*. For example, UE 115-*b* may receive broadcast signaling via a downlink control channel 315, which may carry a paging indication, a paging early indication, a system information indication, a random access indication, or any combination thereof. In some cases, UE 115-*b* may also receive TRS 310 associated with the downlink control channel 315, which may be transmitted by one or both of the TRPs 305. If the broadcast signaling via the downlink control channel 315 is associated with configured TRS 310, UE 115-*b* may be unaware of whether one TRP 305 or multiple TRPs 305 are transmitting the TRS 310, and may also be unaware of a beam and/or SSB associated with the TRS 310.

The present disclosure provides techniques for indicating TRS 310 associated with a broadcast downlink control channel 315 to UE 115-*b*, including indicating whether one or multiple sets of TRS 310 are to be received by UE 115-*b*. For example, the downlink control channel 315 may include or carry an indication of one or more sets of TRS 310 associated with the downlink control channel 315 (e.g., to improve tracking). UE 115-*b* may assume that each set of TRS 310 is QCLed (e.g., QCL Type C and Type D) with a respective SSB, that is associated with the corresponding TRP 305.

In a first example, the downlink control channel 315 may indicate two sets of available reference signal occasions (e.g., TRS 310 and/or CSI-RS occasions). The first set of reference signal occasions may indicate an availability of reference signals transmitted by TRP 305-*a* and the second set of reference signal occasions may indicate an availability of reference signals transmitted by TRP 305-*b*. For example, the first set of reference signal occasions may indicate an availability of TRS 310-*a* transmitted by TRP 305-*a* and the second set of reference signal occasions may indicate an availability of TRS 310-*b* transmitted by TRP 305-*b*. The TRS 310-*a* may be QCLed with a first SSB in a pair of SSBs associated with the downlink control channel 315, where the first SSB may be associated with a first beam for transmissions from TRP 305-*a*. Similarly, the TRS 310-*b* may be QCLed with a second SSB in a pair of SSBs associated with the downlink control channel 315, where the second SSB may be associated with a second beam for transmissions from TRP 305-*b*.

In a second example, the downlink control channel 315 may indicate one set of available reference signal occasions (e.g., TRS 310 and/or CSI-RS occasions) of either TRP 305-*a* or TRP 305-*b*. For example, the set of available reference signal occasions may be associated with a TRP 305 that is an anchor TRP 305. For example, the set of reference signal occasions may indicate an availability of TRS 310-*a* transmitted by TRP 305-*a* or may indicate an availability of TRS 310-*b* transmitted by TRP 305-*b*. The TRS 310 may be QCLed with a first SSB in a pair of SSBs associated with the downlink control channel 315, where the first SSB may be associated with a first beam for transmissions from TRP 305-*a* or TRP 305-*b*.

Figure 4:
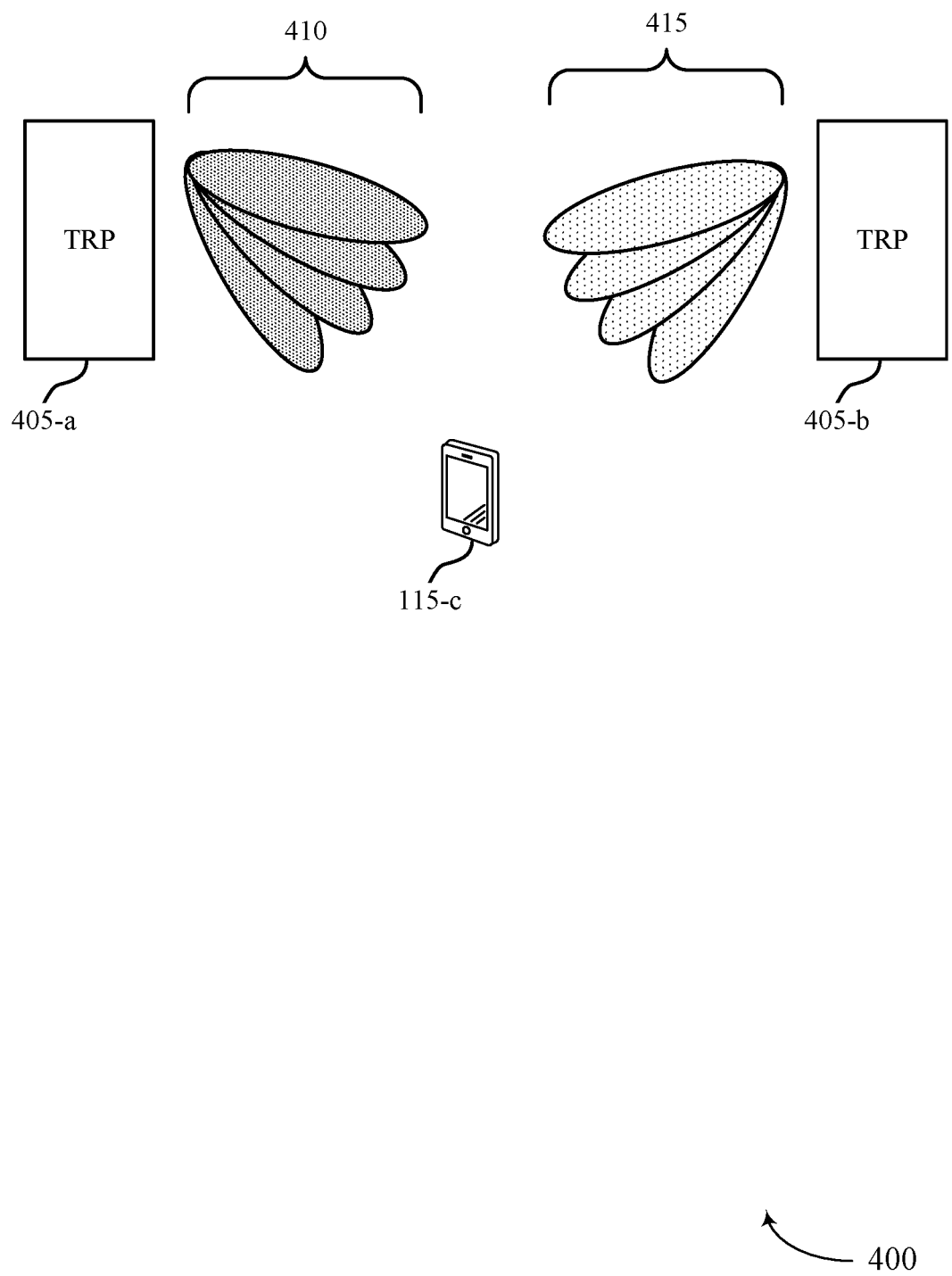
FIG. 4 illustrates an example of a wireless communications system that supports beam identification for paging messages on an SFN in accordance with aspects of the present disclosure.

FIG. 4 illustrates an example of a wireless communications system 400 that supports beam identification for paging messages on an SFN in accordance with aspects of the present disclosure. In some examples, wireless communications system 400 may implement or be implemented by one or more aspects of wireless communications system 100 or 200. For example, wireless communications system 400 may include a UE 115-*c* and TRPs 405-*a* and 405-*b*, which may be examples of a UE 115 and TRPs described with reference to FIGS. 1-3.

As described with reference to FIG. 2, UE 115-*c* may receive one or more downlink transmissions (e.g., a downlink control channel and/or a downlink shared channel) in an idle mode and via an SFN from multiple TRPs 405, such as TRP 405-*a* and TRP 405-*b*. In order to receive a downlink transmission via the SFN and from the TRPs 405, UE 115-*b* may identify a first SSB 410 and a second SSB 415 for reception of the SFN, where the first SSB 410 may be associated with TRP 405-*a* and the second SSB 415 may be associated with TRP 405-*b*. The first SSB 410 may also be associated with a beam used by TRP 405-*a* for the downlink transmission, and the second SSB 415 may be associated with a beam used by TRP 405-*b* for the downlink transmission.

In some cases, UE 115-*c* may receive an indication from TRP 405-*a*, TRP 405-*b*, or both, of the first SSB 410 and the second SSB 415. For example, the indication of the first and second SSBs may be included in a SIB transmitted by TRP 405-*a*, TRP 405-*b*, or both. In some cases, UE 115-*c* may identify the first SSB 410 and the second SSB 415 based on a mapping rule, where the mapping rule may be indicated to UE 115-*c* (e.g., via the SIB) or may be defined and stored at UE 115-*c* (e.g., defined in a wireless communications standards). The mapping rule may indicate an association between a pair of SSBs (e.g., the first SSB 410 and the second SSB 415) and a monitoring occasion for broadcast signaling on a downlink control channel (e.g., a paging monitoring occasion).

For example, the mapping rule may indicate whether a monitoring occasion is associated with a pair of SSBs or with one SSB. The mapping rule may further indicate that a pair of SSBs is mapped to all monitoring occasions (e.g., a set of monitoring occasions), that a pair of SSBs is mapped to a subset of monitoring occasions, or that a pair of SSBs is mapped to one monitoring occasion.

The mapping rule may also indicate the SSBs that are included in a pair of SSBs, for example, using SSB indices. In a first example, the mapping rule may indicate that every two consecutive SSBs (e.g., consecutive SSB indices) are included in a respective pair. For example, SSB indices 0 and 1 (e.g., SSB0, SSB1) may be included in a first pair, SSB indices 2 and 3 (e.g., SSB2, SSB3) may be included in a second pair, and so on. In a second example, the mapping rule may indicate that SSBs (e.g., SSB indices) separated by one other SSB (e.g., one other SSB index) are included in a respective pair (e.g., every other SSB is included in a pair). For example, SSB indices 0 and 2 (e.g., SSB0, SSB2) may be included in a first pair, SSB indices 1 and 3 (e.g., SSB1, SSB3) may be included in a second pair, and so on.

In a third example, SSBs (e.g., SSB indices) offset by half of a total quantity of SSBs (e.g., total quantity of SSB indices) may be included in a respective pair. For example, if a total quantity of SSBs is eight, SSB indices 0 and 4 (e.g., SSB0, SSB4) may be included in a first pair, SSB indices 1 and 5 (e.g., SSB1, SSB5) may be included in a second pair, and so on. In a fourth example, two SSBs associated with a same SSB index on different cells (e.g., different physical cell identifiers (PCIs)) may be included in a respective pair. For example, SSBs with index 0 for a first cell and a second cell (e.g., SSB0-PCI1, SSB0-PCI2) may be included in a first pair, SSBs with index 1 for the first cell and the second cell (e.g., SSB1-PCI1, SSB1-PCI2) may be included in a second pair, and so on.

Based on the mapping rule, UE 115-c may identify a pair of SSBs (e.g., a first SSB 410 and a second SSB 415) associated with a monitoring occasion for a downlink control channel (e.g., a paging monitoring occasion). UE 115-c may further identify a first beam and a second beam associated with the first SSB 410 and the second SSB 415, respectively. UE 115-c may receive the downlink control channel in via an SFN, via the respective first and second beams, based on identifying the first and second SSBs.

Figure 5:
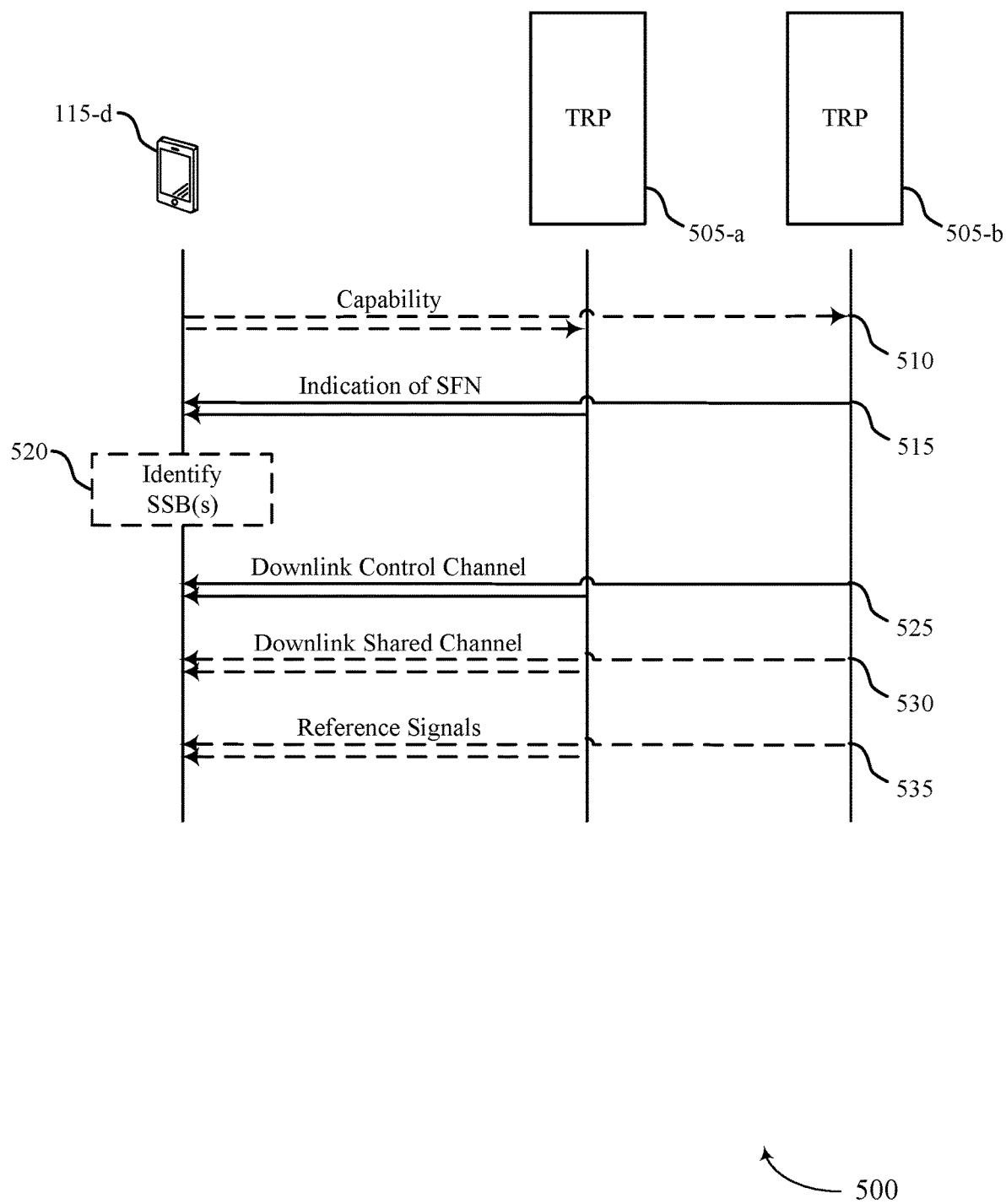
FIG. 5 illustrates an example of a process flow that supports beam identification for paging messages on an SFN in accordance with aspects of the present disclosure.

FIG. 5 illustrates an example of a process flow 500 that supports beam identification for paging messages on an SFN in accordance with aspects of the present disclosure. In some examples, process flow 500 may implement or be implemented by one or more aspects of wireless communications systems 100, 200, 300, or 400. For example, process flow may be implemented by a UE 115-d and TRPs 505-a and 505-b, which may be examples of a UE 115 and TRPs described with reference to FIGS. 1-4.

In the following description of process flow 500, the operations may be performed in a different order than the order shown, or the operations performed by UE 115-d, TRP 505-a, and TRP 505-b may be performed in different orders or at different times. For example, some operations may also be left out of process flow 500, or other operations may be added to process flow 500. In one example, one or more of the indications described herein may be transmitted together, or may be transmitted separately. Although UE 115-d, TRP 505-a, and TRP 505-b are shown performing the operations of process flow 500, some aspects of some operations may also be performed by one or more other wireless devices. For example, a downlink signal received by UE 115-d may be received from another TRP.

At 510, in some cases, UE 115-d may transmit an indication of a UE capability for supporting SFN transmissions for broadcast signaling in an idle mode, from multiple TRPs 505. For example, UE 115-d may indicate that UE 115-d does not support reception of communications in an SFN manner, or may indicate that UE 115-d does support reception of communications in an SFN manner.

At 515, TRP 505-a, TRP 505-b, or both, may transmit, to UE 115-d in an idle mode, signaling indicating that an SFN will be used for broadcast signaling received concurrently from TRPs 505-a and 505-b (e.g., among other TRPs 505). In some cases, the indication of the SFN may be based on the indication of the UE capability. For example, if UE 115-d supports the SFN communications, TRP 505-a, TRP 505-b, or both, may transmit the indication of the SFN.

In some cases, TRP 505-a, TRP 505-b, or both, may also transmit signaling (e.g., a SIB) indicating a first SSB associated with TRP 505-a and a second SSB associated with TRP 505-b. In some cases, the signaling indicating the SSBs may be the same signaling as indicating the SFN. In some cases, the signaling may additionally or alternatively indicate a mapping rule for identifying the first and second SSBs.

At 520, in some cases, UE 115-d may identify the first SSB and the second SSB. For example, UE 115-d may use a mapping rule, as described with reference to FIG. 4, to identify the first SSB and the second SSB.

At 525, TRP 505-a and TRP 505-b may transmit (e.g., at least partially concurrently), to UE 115-d in the idle mode and via the SFN, the broadcast signaling via a downlink control channel. The broadcast signaling may be received by UE 115-d from TRP 505-a via a first beam associated with (e.g., QCLed with) the first SSB and from TRP 505-b via a second beam associated with (e.g., QCLed with) the second SSB. In some cases, the downlink control channel may schedule a downlink shared channel for receiving the broadcast signaling. In some cases, the downlink control channel may indicate one or more sets of reference signal occasions (e.g., TRS occasions) associated with TRP 505-a, TRP 505-b, or both, for example, as described with reference to FIG. 3.

At 530, in some cases, TRP 505-a and TRP 505-b may transmit (e.g., at least partially concurrently), to UE 115-d in the idle mode and via the SFN, the broadcast signaling via the downlink shared channel. The broadcast signaling may be received by UE 115-d from TRP 505-a via a first beam associated with (e.g., QCLed with) the first SSB and from TRP 505-b via a second beam associated with (e.g., QCLed with) the second SSB.

At 535, in some cases, TRP 505-a, TRP 505-b, or both, may transmit, to UE 115-d in the idle mode and via the SFN, the one or more sets of reference signal occasions. For example, TRP 505-a may transmit a first set of reference signals (e.g., TRS) via a first set of reference signal occasions configured for UE 115-d. Additionally, or alternatively, TRP 505-b may transmit a second set of reference signals (e.g., TRS) via a second set of reference signal occasions configured for UE 115-d.

Figure 6:
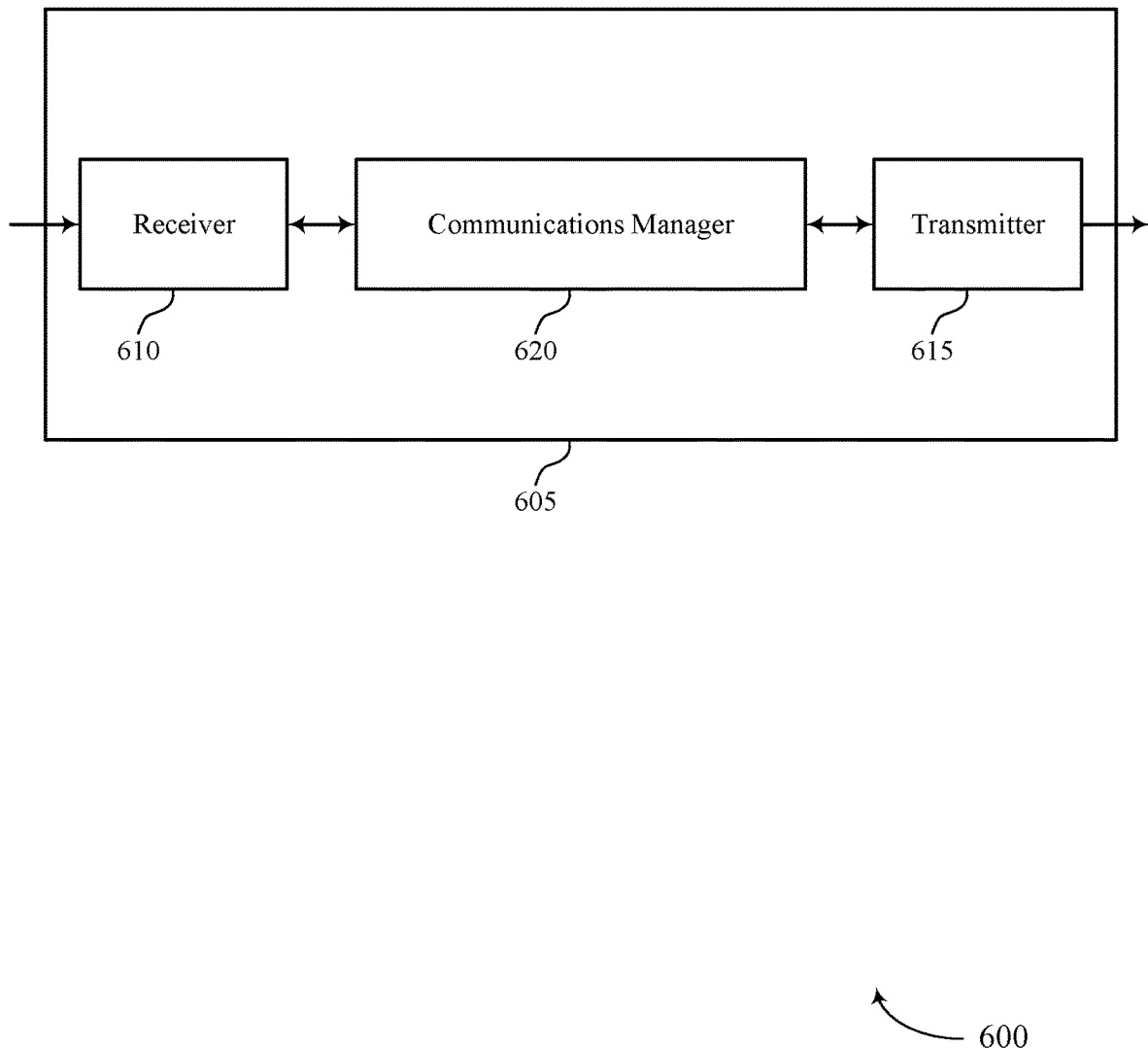
FIGS. 6 and 7 show block diagrams of devices that support beam identification for paging messages on an SFN in accordance with aspects of the present disclosure.

FIG. 6 shows a block diagram 600 of a device 605 that supports beam identification for paging messages on an SFN in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam identification for paging messages on an SFN). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam identification for paging messages on an SFN). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of beam identification for paging messages on an SFN as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, in an idle mode, signaling indicating that an SFN will be used for broadcast signaling received concurrently from a set of multiple TRPs, the set of multiple TRPs including a first TRP and a second TRP. The communications manager 620 may be configured as or otherwise support a means for receiving, in the idle mode and via the SFN, the broadcast signaling via a downlink control channel, the broadcast signaling received from the first TRP via a first beam associated with a first SSB and from the second TRP via a second beam associated with a second SSB.

The actions performed by the communications manager 620, among other examples herein, may be implemented to realize one or more potential advantages. For example, communications manager 620 may increase available battery power and communication quality at a wireless device (e.g., a UE 115) by supporting identification of one or more SSBs associated with SFN transmissions from multiple TRPs, which may increase communication quality at the wireless device by increasing communication diversity. The associated increase in communication quality may result in increased link performance and decreased overhead based on identifying the one or more SSBs. Accordingly, communications manager 620 may save power and increase battery life at a wireless device (e.g., a UE 115) by strategically increasing a quality of communications at a wireless device (e.g., a UE 115).

Figure 7:
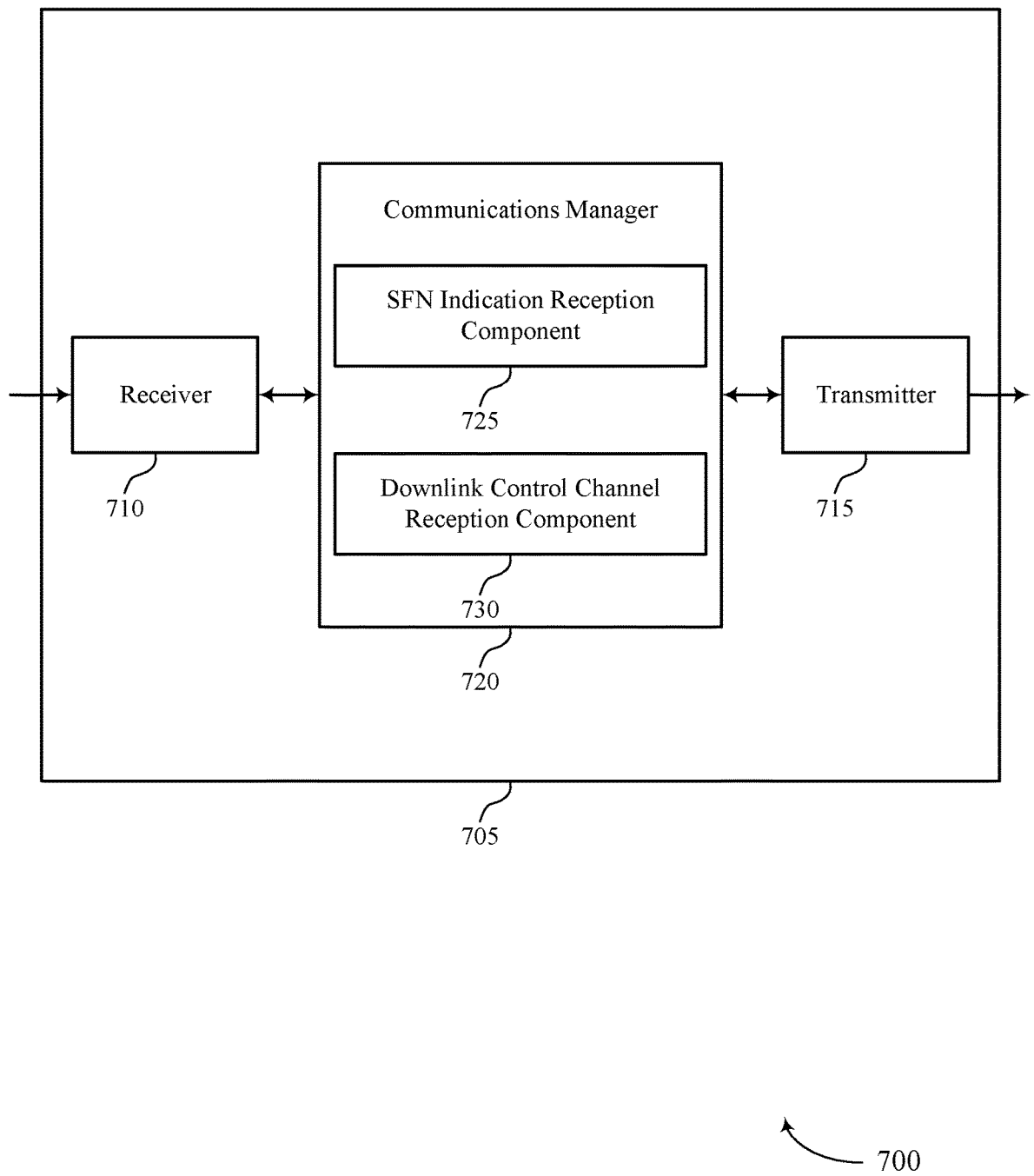

FIG. 7 shows a block diagram 700 of a device 705 that supports beam identification for paging messages on an SFN in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to beam identification for paging messages on an SFN). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to beam identification for paging messages on an SFN). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of beam identification for paging messages on an SFN as described herein. For example, the communications manager 720 may include an SFN indication reception component 725 a downlink control channel reception component 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The SFN indication reception component 725 may be configured as or otherwise support a means for receiving, in an idle mode, signaling indicating that an SFN will be used for broadcast signaling received concurrently from a set of multiple TRPs, the set of multiple TRPs including a first TRP and a second TRP. The downlink control channel reception component 730 may be configured as or otherwise support a means for receiving, in the idle mode and via the SFN, the broadcast signaling via a downlink control channel, the broadcast signaling received from the first TRP via a first beam associated with a first SSB and from the second TRP via a second beam associated with a second SSB.

A processor of a wireless device (e.g., controlling the receiver 710, the transmitter 715, or the transceiver 915 as described with reference to FIG. 9) may increase available battery power and communication quality. The increased communication quality may increase available battery power and throughput (e.g., via implementation of system components described with reference to FIG. 8) compared to other systems and techniques, for example, that do not support SSB identification techniques. Further, the processor of the wireless device may identify one or more aspects of an SSB for SFN communications, which may result in increased communication quality, as well as save power and increase battery life at the wireless device (e.g., by strategically supporting SFN communications), among other benefits.

Figure 8:
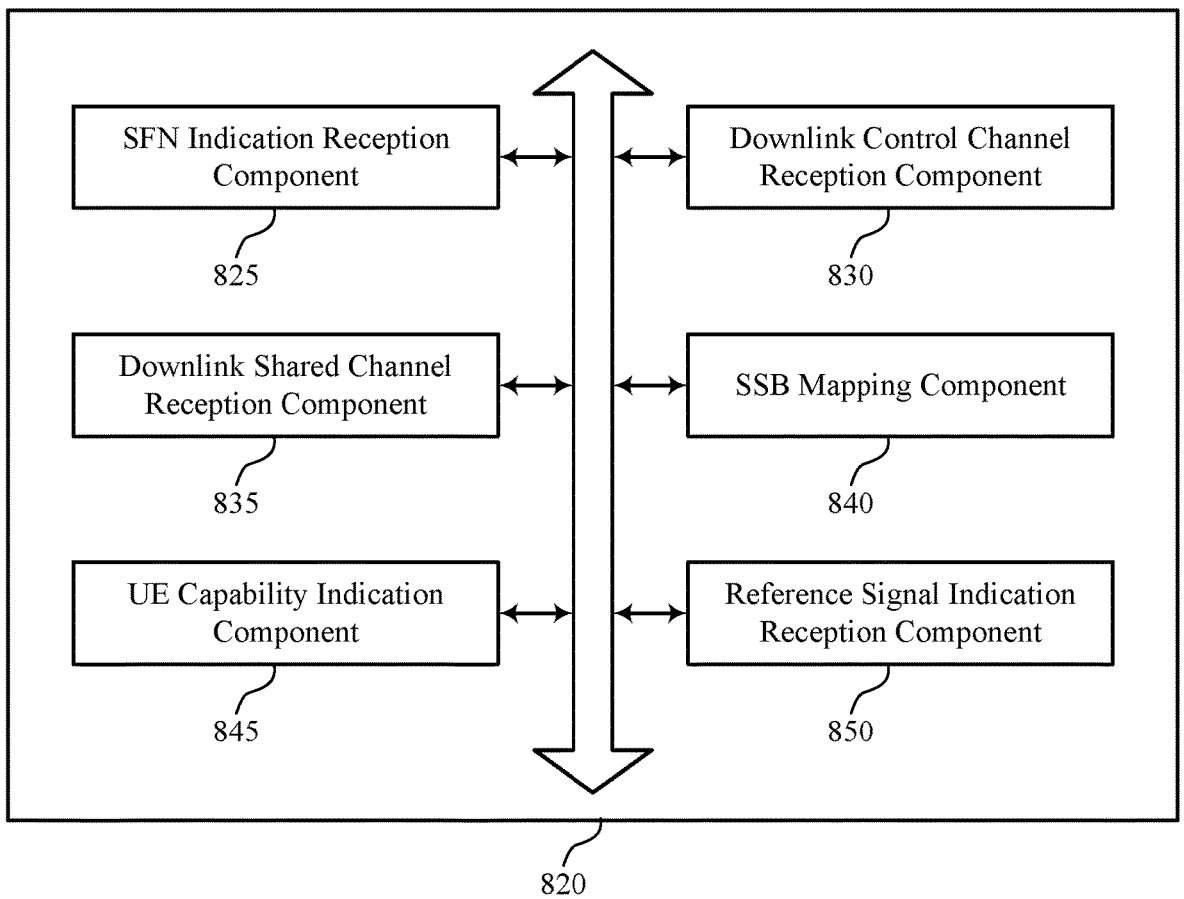
FIG. 8 shows a block diagram of a communications manager that supports beam identification for paging messages on an SFN in accordance with aspects of the present disclosure.

FIG. 8 shows a block diagram 800 of a communications manager 820 that supports beam identification for paging messages on an SFN in accordance with aspects of the present disclosure. The communications manager 820 may be an example of aspects of a communications manager 620, a communications manager 720, or both, as described herein. The communications manager 820, or various components thereof, may be an example of means for performing various aspects of beam identification for paging messages on an SFN as described herein. For example, the communications manager 820 may include an SFN indication reception component 825, a downlink control channel reception component 830, a downlink shared channel reception component 835, an SSB mapping component 840, a UE capability indication component 845, a reference signal indication reception component 850, or any combination thereof. Each of these components may communicate, directly or indirectly, with one another (e.g., via one or more buses).

The communications manager 820 may support wireless communication at a UE in accordance with examples as disclosed herein. The SFN indication reception component 825 may be configured as or otherwise support a means for receiving, in an idle mode, signaling indicating that an SFN will be used for broadcast signaling received concurrently from a set of multiple TRPs, the set of multiple TRPs including a first TRP and a second TRP. The downlink control channel reception component 830 may be configured as or otherwise support a means for receiving, in the idle mode and via the SFN, the broadcast signaling via a downlink control channel, the broadcast signaling received from the first TRP via a first beam associated with a first SSB and from the second TRP via a second beam associated with a second SSB.

In some examples, the downlink shared channel reception component 835 may be configured as or otherwise support a means for receiving, in the idle mode and via the SFN, the broadcast signaling via a downlink shared channel that is scheduled by the downlink control channel. The broadcast signaling via the downlink shared channel may be received from the first TRP via the first beam and from the second TRP via the second beam.

In some examples, the SFN indication reception component 825 may be configured as or otherwise support a means for receiving signaling indicating that the first SSB is associated with the first TRP and that the second SSB is associated with the second TRP for the broadcast signaling, where receiving the downlink control channel from the first TRP via the first beam and from the second TRP via the second beam is based on the indication of the first SSB and the second SSB. In some examples, the signaling indicates that the first SSB and the second SSB are associated with a CORESET for the broadcast signaling, a search space set for the broadcast signaling, or a monitoring opportunity for the broadcast signaling.

In some examples, the SSB mapping component 840 may be configured as or otherwise support a means for identifying that the first SSB is associated with the first TRP and that the second SSB is associated with the second TRP for the broadcast signaling based on a mapping rule, where receiving the downlink control channel from the first TRP via the first beam and from the second TRP via the second beam is based on the identifying. In some examples, the SSB mapping component 840 may be configured as or otherwise support a means for receiving a SIB transmission indicating the mapping rule. In some examples, the mapping rule associates each of a set of one or more monitoring opportunities for the broadcast signaling with a respective pair of SSBs or with a respective SSB.

In some examples, each respective pair of SSBs includes two SSBs having consecutive index numbers. In some examples, each respective pair of SSBs includes two SSBs having index numbers that are offset by two. In some examples, each respective pair of SSBs includes two SSBs having index numbers that are offset by a quantity equal to half of a total quantity of index numbers. In some examples, each respective pair of SSBs includes two SSBs on different cells that have a same index number.

In some examples, one pair of SSBs is mapped to each of the set of one or more monitoring opportunities. In some examples, one pair of SSBs is mapped to each monitoring opportunity in a subset of the set of one or more monitoring opportunities. In some examples, one pair of SSBs is mapped to one monitoring opportunity of the set of one or more monitoring opportunities.

In some examples, the UE capability indication component 845 may be configured as or otherwise support a means for transmitting signaling indicating a capability of the UE to use the SFN to receive the broadcast signaling concurrently from the set of multiple TRPs, where receiving the signaling that indicates to use the SFN is based on transmitting the signaling indicating the capability of the UE.

In some examples, to support receiving the downlink control channel for the broadcast signaling, the reference signal indication reception component 850 may be configured as or otherwise support a means for receiving, via the downlink control channel, an indication of a first set of one or more reference signal occasions associated with the first TRP and a second set of one or more reference signal occasions associated with the second TRP. In some examples, the first set of one or more reference signal occasions is QCLed with the first SSB based on being associated with the first TRP and the second set of one or more reference signal occasions is QCLed with the second SSB based on being associated with the second TRP.

In some examples, to support receiving the downlink control channel for the broadcast signaling, the reference signal indication reception component 850 may be configured as or otherwise support a means for receiving, via the downlink control channel, an indication of a set of one or more reference signal occasions associated with the first TRP, where the first TRP is an anchor TRP. In some examples, the set of one or more reference signal occasions is QCLed with the first SSB based on being associated with the first TRP or based on the downlink control channel indicating that the set of one or more reference signal occasions is QCLed with the first SSB.

In some examples, the downlink control channel includes a paging indication, a paging early indication, a system information indication, a random access indication, or any combination thereof. In some examples, a downlink shared channel scheduled by the downlink control channel includes a paging message, a SIB, other system information, a random access message, or any combination thereof. In some examples, the idle mode includes an RRC idle mode or an RRC inactive mode. In some examples, the first SSB is associated with a first cell and the second SSB is associated with a second cell.

Figure 9:
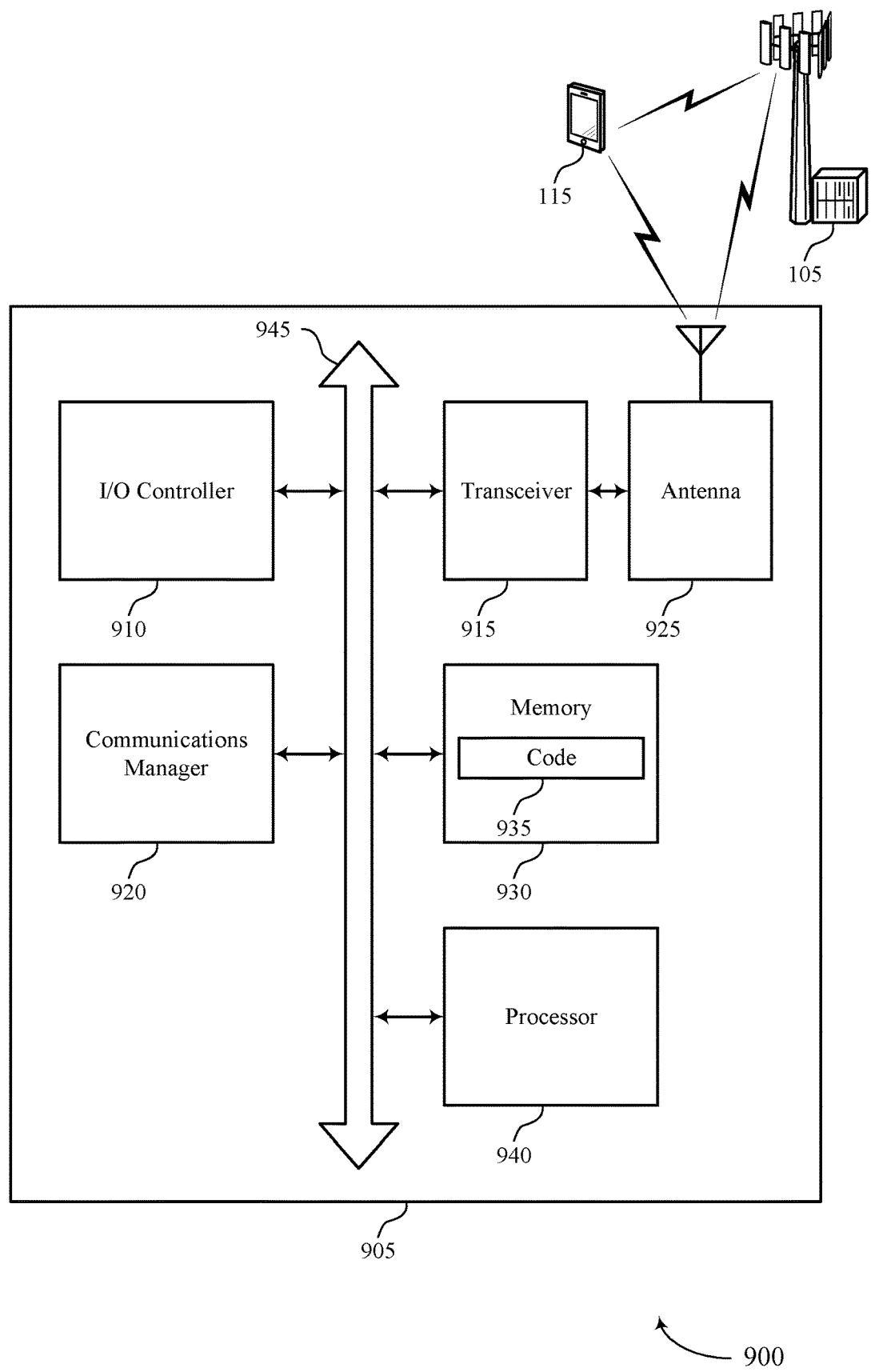
FIG. 9 shows a diagram of a system including a device that supports beam identification for paging messages on an SFN in accordance with aspects of the present disclosure.

FIG. 9 shows a diagram of a system 900 including a device 905 that supports beam identification for paging messages on an SFN in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting beam identification for paging messages on an SFN). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, in an idle mode, signaling indicating that an SFN will be used for broadcast signaling received concurrently from a set of multiple TRPs, the set of multiple TRPs including a first TRP and a second TRP. The communications manager 920 may be configured as or otherwise support a means for receiving, in the idle mode and via the SFN, the broadcast signaling via a downlink control channel, the broadcast signaling received from the first TRP via a first beam associated with a first SSB and from the second TRP via a second beam associated with a second SSB.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of beam identification for paging messages on an SFN as described herein, or the processor 940 and the memory 930 may be otherwise configured to perform or support such operations.

Figure 10:
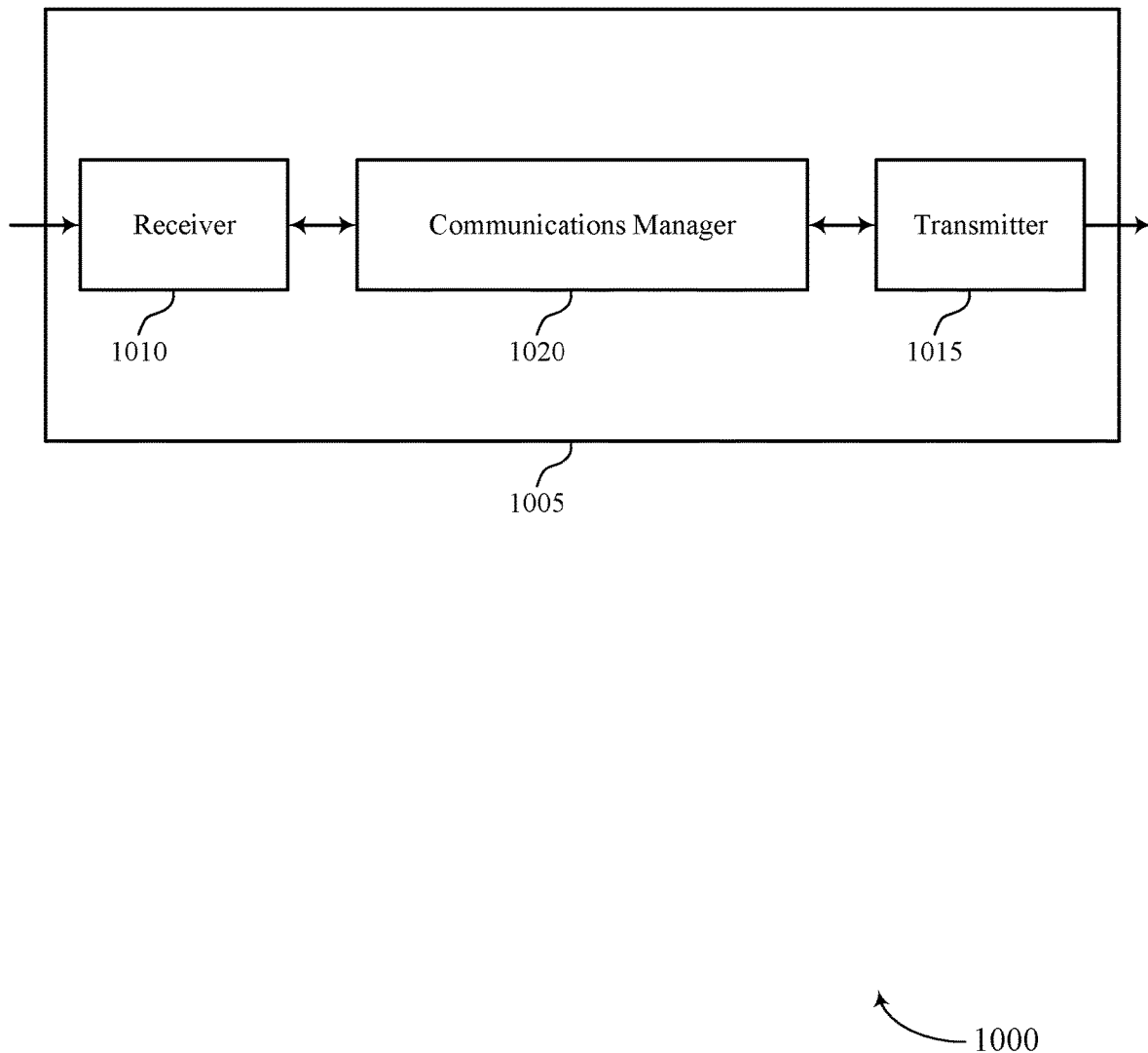
FIGS. 10 and 11 show block diagrams of devices that support beam identification for paging messages on an SFN in accordance with aspects of the present disclosure.

FIG. 10 shows a block diagram 1000 of a device 1005 that supports beam identification for paging messages on an SFN in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to beam identification for paging messages on an SFN). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to beam identification for paging messages on an SFN). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of beam identification for paging messages on an SFN as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first TRP in accordance with examples as disclosed herein. For example, the communications manager 1020 may be configured as or otherwise support a means for transmitting, to a UE in an idle mode, signaling indicating that an SFN will be used for broadcast signaling received concurrently from a set of multiple TRPs, the set of multiple TRPs including the first TRP and a second TRP. The communications manager 1020 may be configured as or otherwise support a means for transmitting, to the UE in the idle mode and via the SFN, the broadcast signaling via a downlink control channel, the broadcast signaling transmitted via a first beam associated with a first SSB and transmitted concurrently with a transmission of the downlink control channel from the second TRP via a second beam associated with a second SSB.

Figure 11:
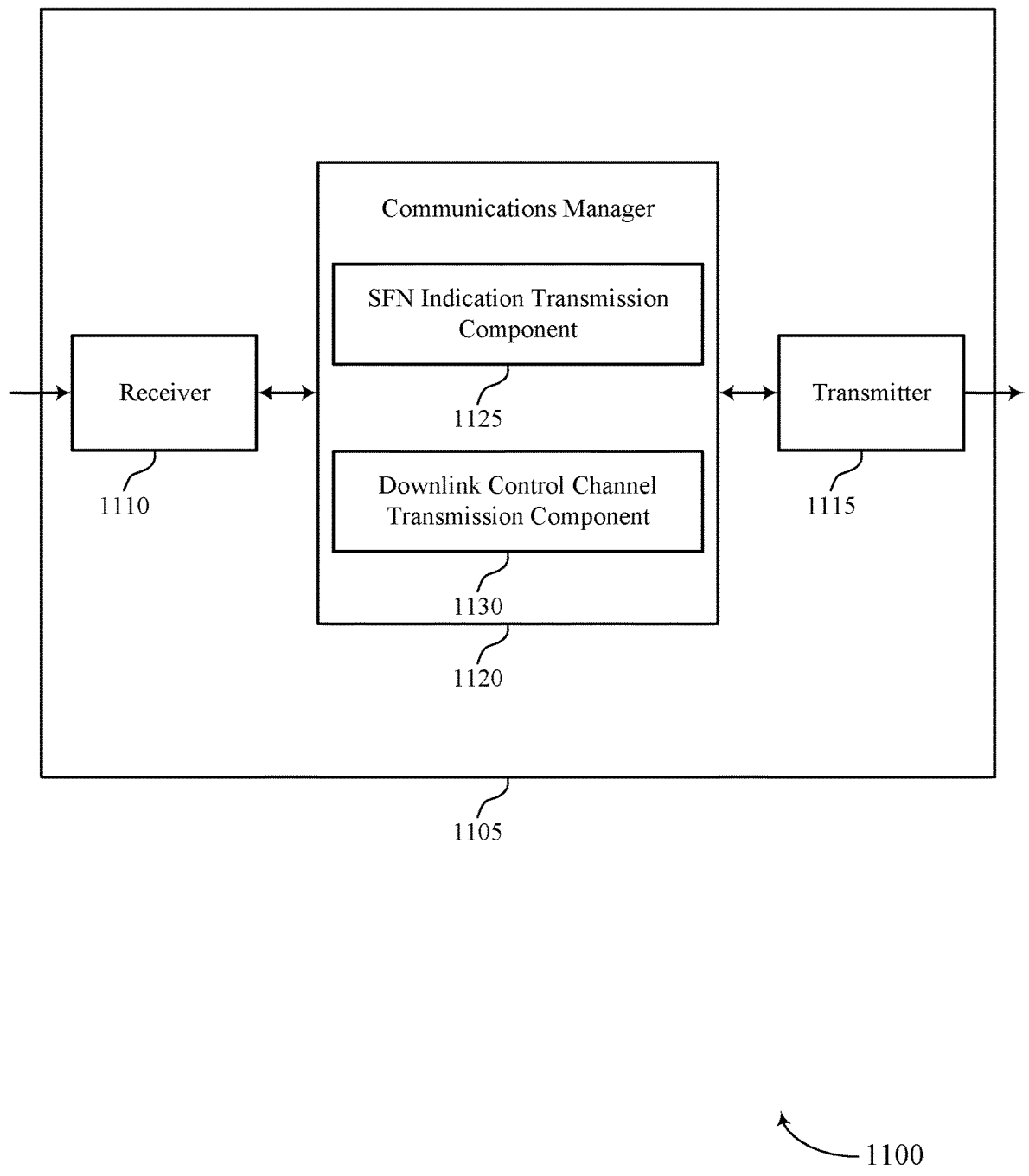

FIG. 11 shows a block diagram 1100 of a device 1105 that supports beam identification for paging messages on an SFN in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to beam identification for paging messages on an SFN). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to beam identification for paging messages on an SFN). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of beam identification for paging messages on an SFN as described herein. For example, the communications manager 1120 may include an SFN indication transmission component 1125 a downlink control channel transmission component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first TRP in accordance with examples as disclosed herein. The SFN indication transmission component 1125 may be configured as or otherwise support a means for transmitting, to a UE in an idle mode, signaling indicating that an SFN will be used for broadcast signaling received concurrently from a set of multiple TRPs, the set of multiple TRPs including the first TRP and a second TRP. The downlink control channel transmission component 1130 may be configured as or otherwise support a means for transmitting, to the UE in the idle mode and via the SFN, the broadcast signaling via a downlink control channel, the broadcast signaling transmitted via a first beam associated with a first SSB and transmitted concurrently with a transmission of the downlink control channel from the second TRP via a second beam associated with a second SSB.

Figure 12:
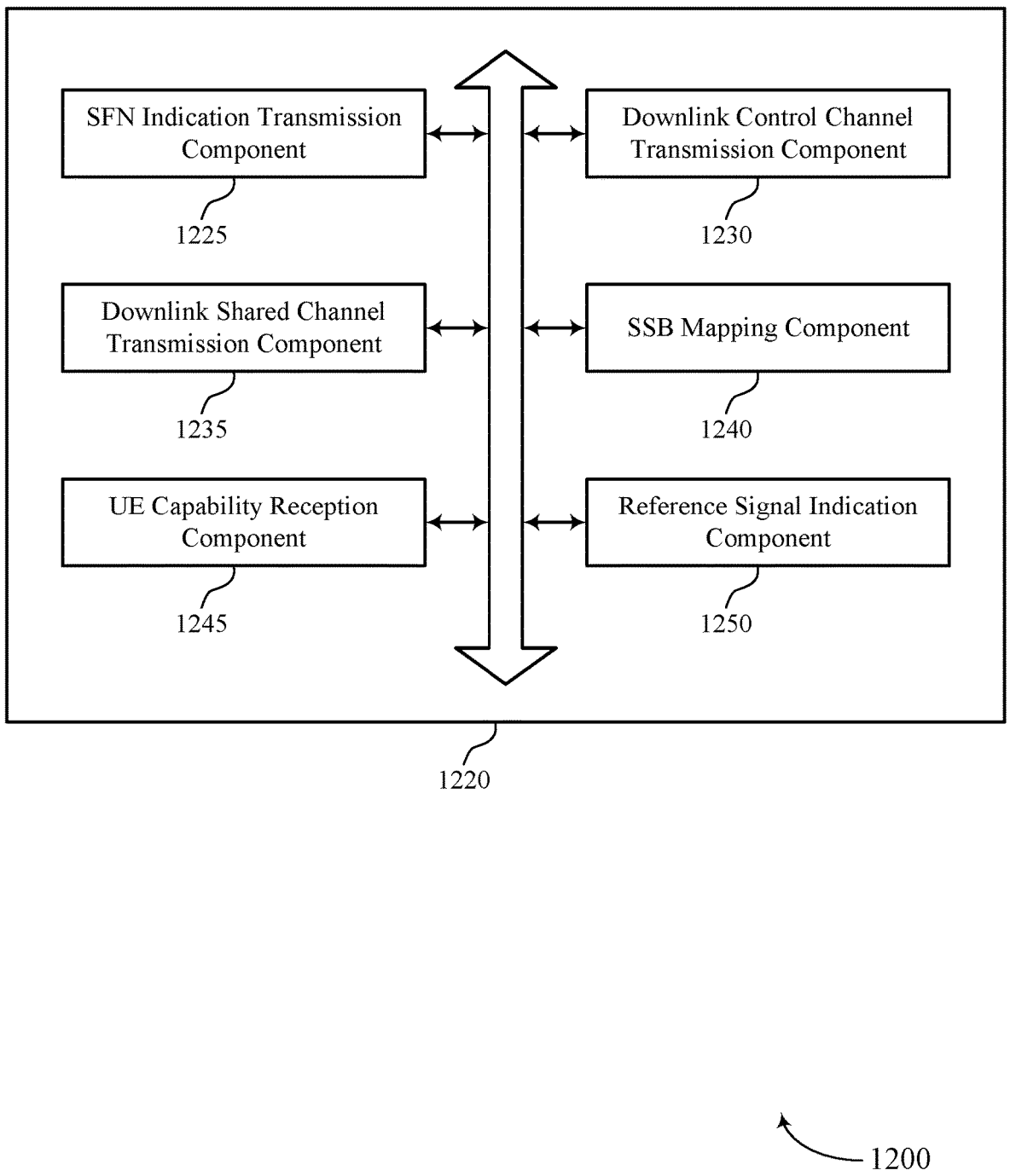
FIG. 12 shows a block diagram of a communications manager that supports beam identification for paging messages on an SFN in accordance with aspects of the present disclosure.

FIG. 12 shows a block diagram 1200 of a communications manager 1220 that supports beam identification for paging messages on an SFN in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of beam identification for paging messages on an SFN as described herein. For example, the communications manager 1220 may include an SFN indication transmission component 1225, a downlink control channel transmission component 1230, a downlink shared channel transmission component 1235, an SSB mapping component 1240, a UE capability reception component 1245, a reference signal indication component 1250, or any combination thereof. Each of these components may communicate, directly or indirectly, with one another (e.g., via one or more buses).

The communications manager 1220 may support wireless communication at a first TRP in accordance with examples as disclosed herein. The SFN indication transmission component 1225 may be configured as or otherwise support a means for transmitting, to a UE in an idle mode, signaling indicating that an SFN will be used for broadcast signaling received concurrently from a set of multiple TRPs, the set of multiple TRPs including the first TRP and a second TRP. The downlink control channel transmission component 1230 may be configured as or otherwise support a means for transmitting, to the UE in the idle mode and via the SFN, the broadcast signaling via a downlink control channel, the broadcast signaling transmitted via a first beam associated with a first SSB and transmitted concurrently with a transmission of the downlink control channel from the second TRP via a second beam associated with a second SSB.

In some examples, the downlink shared channel transmission component 1235 may be configured as or otherwise support a means for transmitting, to the UE in the idle mode and via the SFN, the broadcast signaling via a downlink shared channel that is scheduled by the downlink control channel. The broadcast signaling via the downlink shared channel may be transmitted from the first TRP via the first beam and transmitted concurrently with a transmission of the downlink shared channel from the second TRP via the second beam.

In some examples, the SFN indication transmission component 1225 may be configured as or otherwise support a means for transmitting signaling indicating that the first SSB is associated with the first TRP and that the second SSB is associated with the second TRP for the broadcast signaling, where transmitting the downlink control channel via the first beam is based on the indication of the first SSB and the second SSB. In some examples, the signaling indicates that the first SSB and the second SSB are associated with a control resource set for the broadcast signaling, a search space set for the broadcast signaling, or a monitoring opportunity for the broadcast signaling.

In some examples, the SSB mapping component 1240 may be configured as or otherwise support a means for identifying that the first SSB is associated with the first TRP and that the second SSB is associated with the second TRP for the broadcast signaling based on a mapping rule, where transmitting the downlink control channel via the first beam is based on the identifying. In some examples, the SSB mapping component 1240 may be configured as or otherwise support a means for transmitting a SIB transmission indicating the mapping rule. In some examples, the mapping rule associates each of a set of one or more monitoring opportunities for the broadcast signaling with a respective pair of SSBs or with a respective SSB.

In some examples, each respective pair of SSBs includes two SSBs having consecutive index numbers. In some examples, each respective pair of SSBs includes two SSBs having index numbers that are offset by two. In some examples, each respective pair of SSBs includes two SSBs having index numbers that are offset by a quantity equal to half of a total quantity of index numbers. In some examples, each respective pair of SSBs includes two SSBs on different cells that have a same index number.

In some examples, one pair of SSBs is mapped to each of the set of one or more monitoring opportunities. In some examples, one pair of SSBs is mapped to each monitoring opportunity in a subset of the set of one or more monitoring opportunities. In some examples, one pair of SSBs is mapped to one monitoring opportunity of the set of one or more monitoring opportunities.

In some examples, the UE capability reception component 1245 may be configured as or otherwise support a means for receiving signaling indicating a capability of the UE to use the SFN to receive the broadcast signaling concurrently from the set of multiple TRPs, where transmitting the signaling that indicates to use the SFN is based on receiving the signaling indicating the capability of the UE.

In some examples, to support transmitting the downlink control channel for the broadcast signaling, the reference signal indication component 1250 may be configured as or otherwise support a means for transmitting, via the downlink control channel, an indication of a first set of one or more reference signal occasions associated with the first TRP and a second set of one or more reference signal occasions associated with the second TRP. In some examples, the first set of one or more reference signal occasions is QCLed with the first SSB based on being associated with the first TRP and the second set of one or more reference signal occasions is QCLed with the second SSB based on being associated with the second TRP.

In some examples, to support transmitting the downlink control channel for the broadcast signaling, the reference signal indication component 1250 may be configured as or otherwise support a means for transmitting, via the downlink control channel, an indication of a set of one or more reference signal occasions associated with the first TRP, where the first TRP is an anchor TRP. In some examples, the set of one or more reference signal occasions is QCLed with the first SSB based on being associated with the first TRP or based on the downlink control channel indicating that the set of one or more reference signal occasions is QCLed with the first SSB.

In some examples, the downlink control channel includes a paging indication, a paging early indication, a system information indication, a random access indication, or any combination thereof. In some examples, a downlink shared channel scheduled by the downlink control channel includes a paging message, a SIB, other system information, a random access message, or any combination thereof. In some examples, the idle mode includes an RRC idle mode or an RRC inactive mode. In some examples, the first SSB is associated with a first cell and the second SSB is associated with a second cell.

Figure 13:
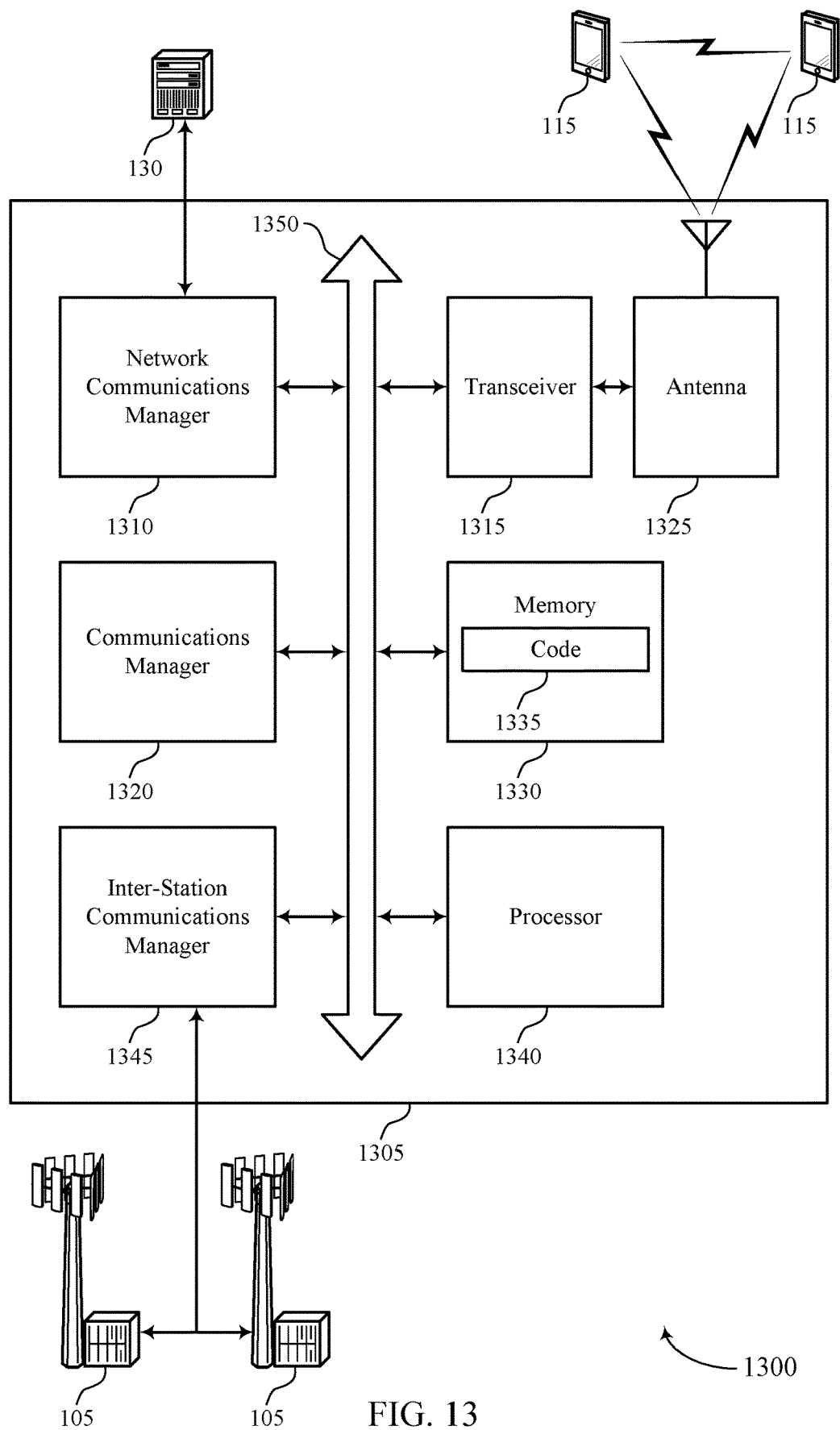
FIG. 13 shows a diagram of a system including a device that supports beam identification for paging messages on an SFN in accordance with aspects of the present disclosure.

FIG. 13 shows a diagram of a system 1300 including a device 1305 that supports beam identification for paging messages on an SFN in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting beam identification for paging messages on an SFN). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a first TRP in accordance with examples as disclosed herein. For example, the communications manager 1320 may be configured as or otherwise support a means for transmitting, to a UE in an idle mode, signaling indicating that an SFN will be used for broadcast signaling received concurrently from a set of multiple TRPs, the set of multiple TRPs including the first TRP and a second TRP. The communications manager 1320 may be configured as or otherwise support a means for transmitting, to the UE in the idle mode and via the SFN, the broadcast signaling via a downlink control channel, the broadcast signaling transmitted via a first beam associated with a first SSB and transmitted concurrently with a transmission of the downlink control channel from the second TRP via a second beam associated with a second SSB.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of beam identification for paging messages on an SFN as described herein, or the processor 1340 and the memory 1330 may be otherwise configured to perform or support such operations.

Figure 14:
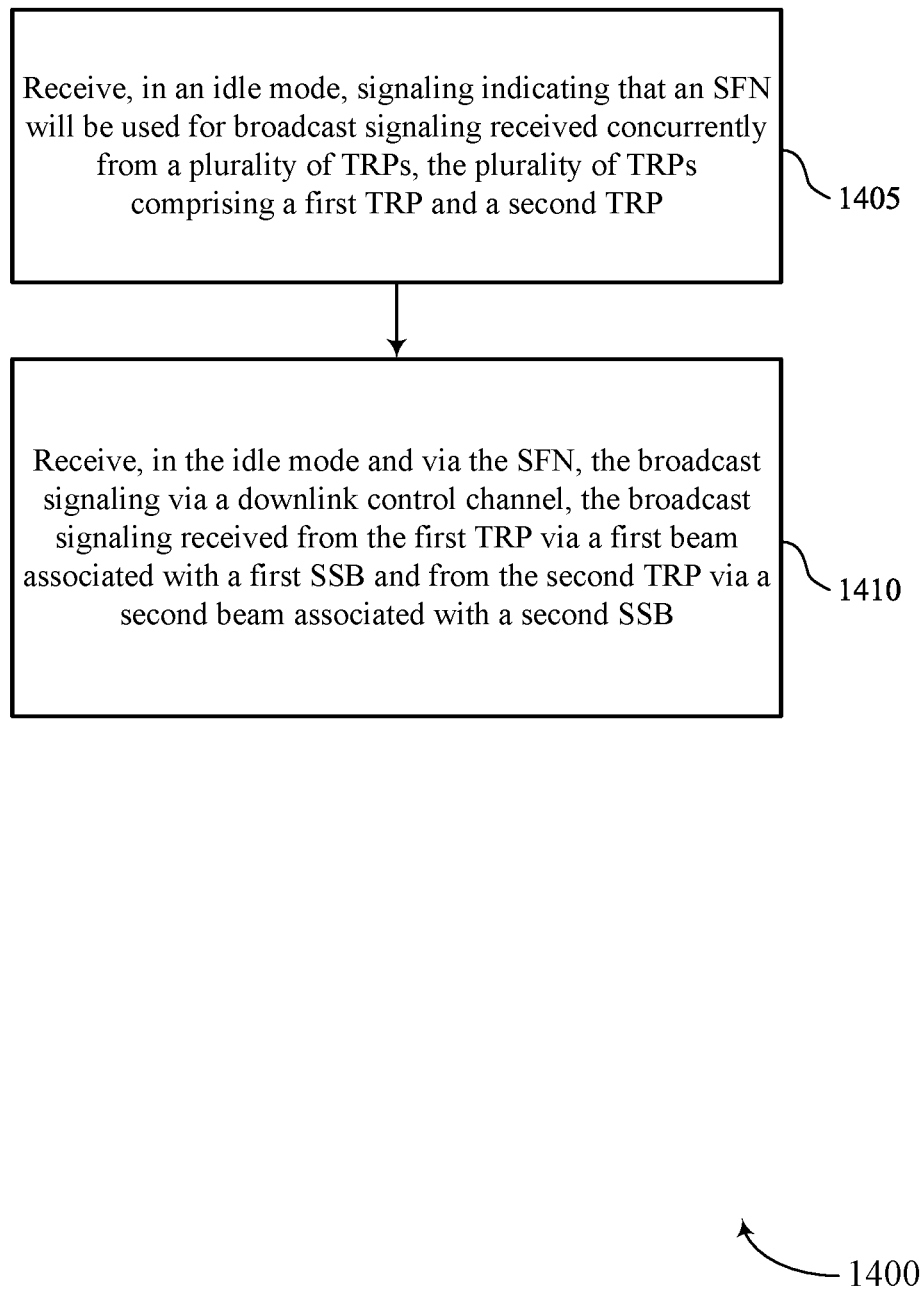
FIGS. 14 through 17 show flowcharts illustrating methods that support beam identification for paging messages on an SFN in accordance with aspects of the present disclosure.

FIG. 14 shows a flowchart illustrating a method 1400 that supports beam identification for paging messages on an SFN in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, in an idle mode, signaling indicating that an SFN will be used for broadcast signaling received concurrently from a set of multiple TRPs, the set of multiple TRPs including a first TRP and a second TRP. The operations of 1405 may be performed in accordance with examples as disclosed herein. In some examples, aspects of the operations of 1405 may be performed by an SFN indication reception component 825 as described with reference to FIG. 8.

At 1410, the method may include receiving, in the idle mode and via the SFN, the broadcast signaling via a downlink control channel, the broadcast signaling received from the first TRP via a first beam associated with a first SSB and from the second TRP via a second beam associated with a second SSB. The operations of 1410 may be performed in accordance with examples as disclosed herein. In some examples, aspects of the operations of 1410 may be performed by a downlink control channel reception component 830 as described with reference to FIG. 8.

Figure 15:
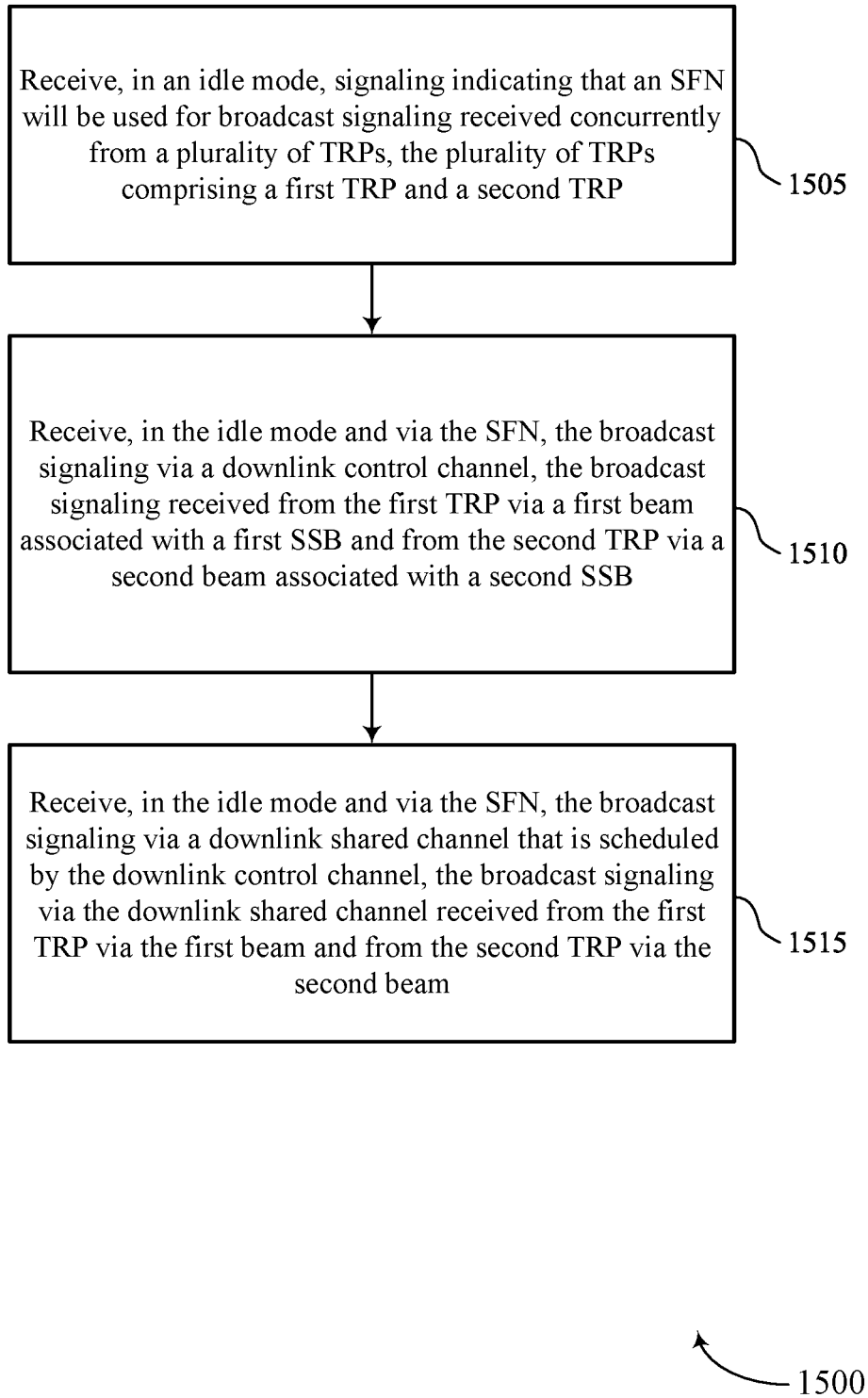

FIG. 15 shows a flowchart illustrating a method 1500 that supports beam identification for paging messages on an SFN in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, in an idle mode, signaling indicating that an SFN will be used for broadcast signaling received concurrently from a set of multiple TRPs, the set of multiple TRPs including a first TRP and a second TRP. The operations of 1505 may be performed in accordance with examples as disclosed herein. In some examples, aspects of the operations of 1505 may be performed by an SFN indication reception component 825 as described with reference to FIG. 8.

At 1510, the method may include receiving, in the idle mode and via the SFN, the broadcast signaling via a downlink control channel, the broadcast signaling received from the first TRP via a first beam associated with a first SSB and from the second TRP via a second beam associated with a second SSB. The operations of 1510 may be performed in accordance with examples as disclosed herein. In some examples, aspects of the operations of 1510 may be performed by a downlink control channel reception component 830 as described with reference to FIG. 8.

At 1515, the method may include receiving, in the idle mode and via the SFN, the broadcast signaling via a downlink shared channel that is scheduled by the downlink control channel, the broadcast signaling via the downlink shared channel received from the first TRP via the first beam and from the second TRP via the second beam. The operations of 1515 may be performed in accordance with examples as disclosed herein. In some examples, aspects of the operations of 1515 may be performed by a downlink shared channel reception component 835 as described with reference to FIG. 8.

Figure 16:
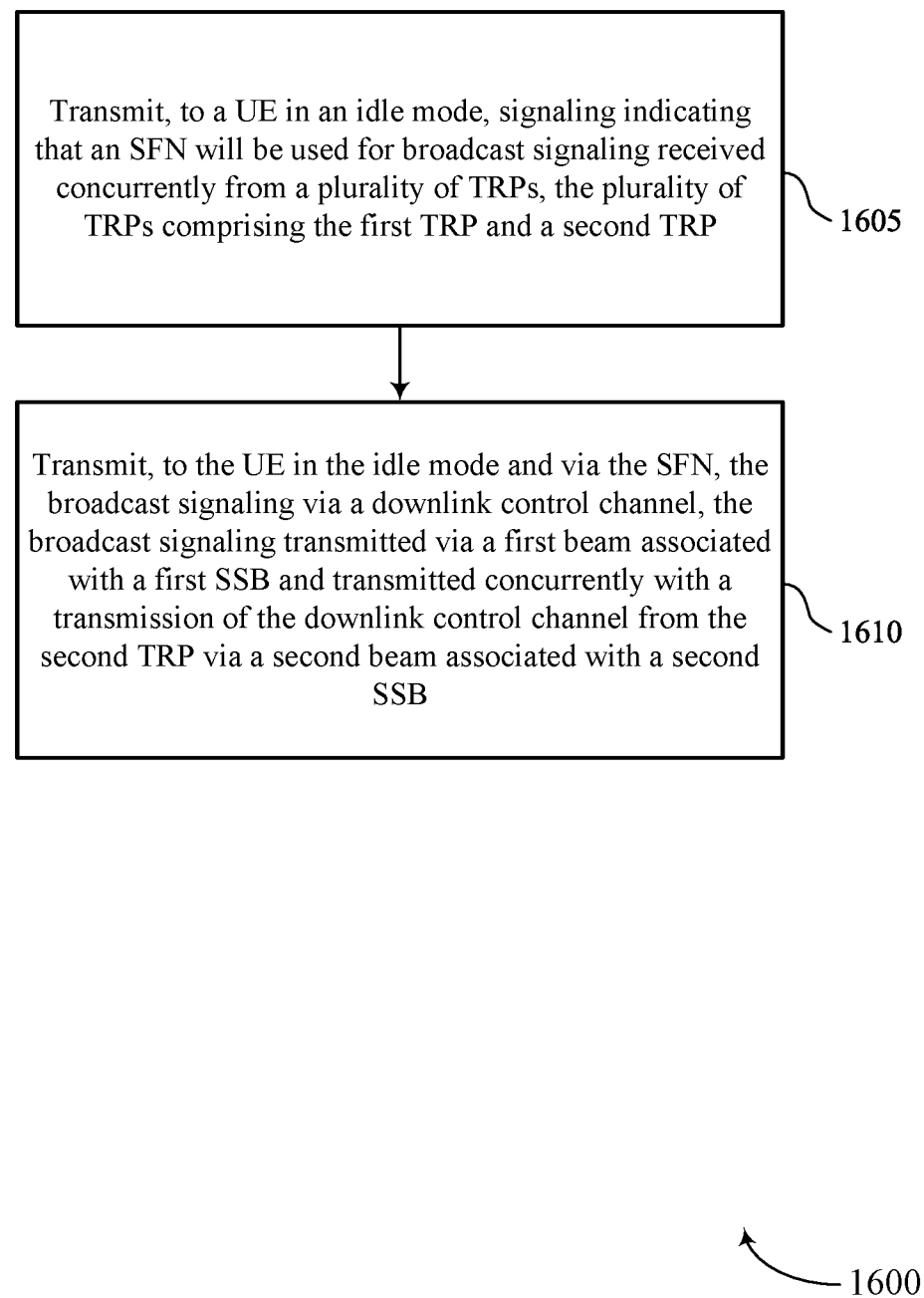

FIG. 16 shows a flowchart illustrating a method 1600 that supports beam identification for paging messages on an SFN in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1605, the method may include transmitting, to a UE in an idle mode, signaling indicating that an SFN will be used for broadcast signaling received concurrently from a set of multiple TRPs, the set of multiple TRPs including the first TRP and a second TRP. The operations of 1605 may be performed in accordance with examples as disclosed herein. In some examples, aspects of the operations of 1605 may be performed by an SFN indication transmission component 1225 as described with reference to FIG. 12.

At 1610, the method may include transmitting, to the UE in the idle mode and via the SFN, the broadcast signaling via a downlink control channel, the broadcast signaling transmitted via a first beam associated with a first SSB and transmitted concurrently with a transmission of the downlink control channel from the second TRP via a second beam associated with a second SSB. The operations of 1610 may be performed in accordance with examples as disclosed herein. In some examples, aspects of the operations of 1610 may be performed by a downlink control channel transmission component 1230 as described with reference to FIG. 12.

Figure 17:
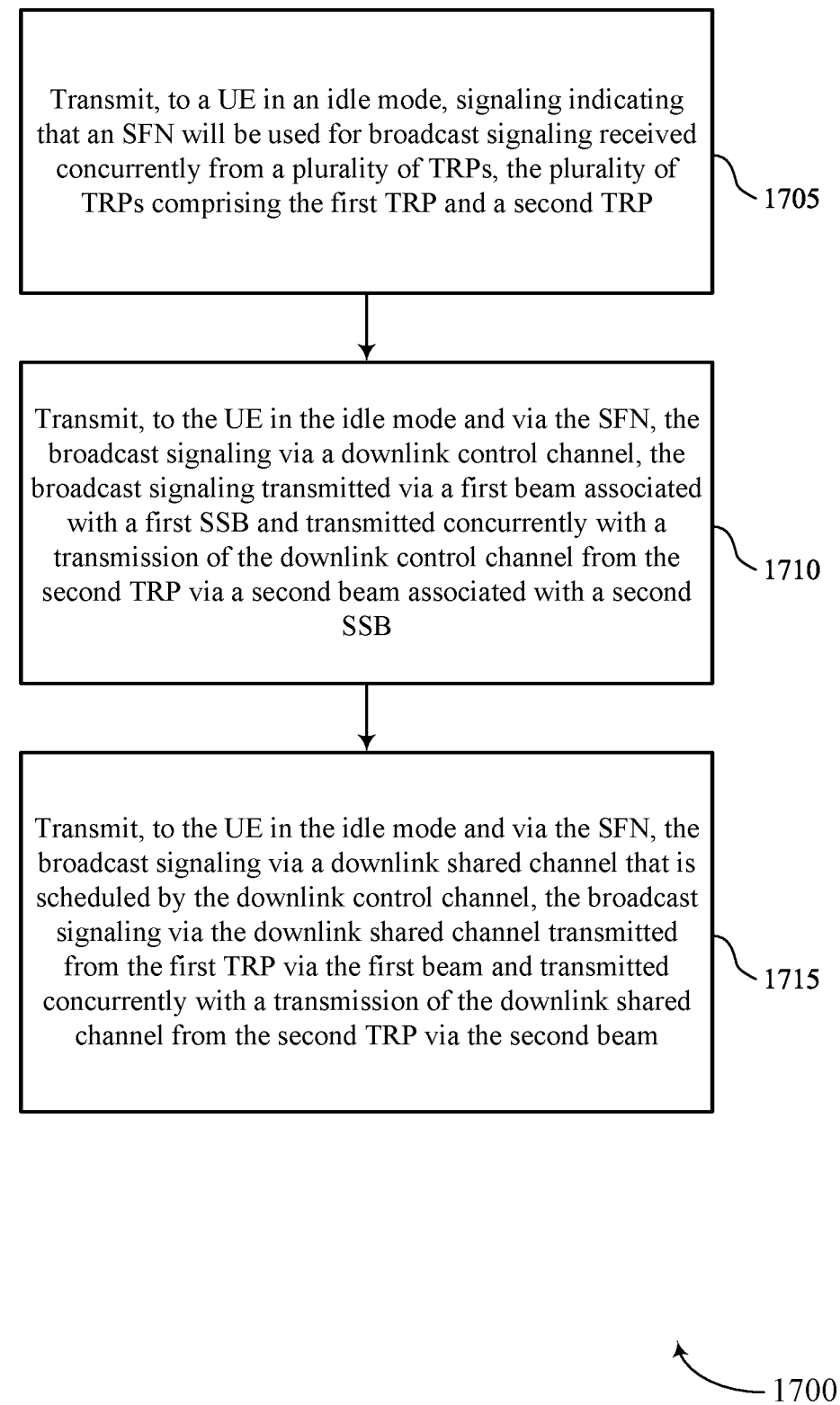

FIG. 17 shows a flowchart illustrating a method 1700 that supports beam identification for paging messages on an SFN in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1705, the method may include transmitting, to a UE in an idle mode, signaling indicating that an SFN will be used for broadcast signaling received concurrently from a set of multiple TRPs, the set of multiple TRPs including the first TRP and a second TRP. The operations of 1705 may be performed in accordance with examples as disclosed herein. In some examples, aspects of the operations of 1705 may be performed by an SFN indication transmission component 1225 as described with reference to FIG. 12.

At 1710, the method may include transmitting, to the UE in the idle mode and via the SFN, the broadcast signaling via a downlink control channel, the broadcast signaling transmitted via a first beam associated with a first SSB and transmitted concurrently with a transmission of the downlink control channel from the second TRP via a second beam associated with a second SSB. The operations of 1710 may be performed in accordance with examples as disclosed herein. In some examples, aspects of the operations of 1710 may be performed by a downlink control channel transmission component 1230 as described with reference to FIG. 12.

At 1715, the method may include transmitting, to the UE in the idle mode and via the SFN, the broadcast signaling via a downlink shared channel that is scheduled by the downlink control channel, the broadcast signaling via the downlink shared channel transmitted from the first TRP via the first beam and transmitted concurrently with a transmission of the downlink shared channel from the second TRP via the second beam. The operations of 1715 may be performed in accordance with examples as disclosed herein. In some examples, aspects of the operations of 1715 may be performed by a downlink shared channel transmission component 1235 as described with reference to FIG. 12.

The following provides an overview of aspects of the present disclosure:

Aspect 1: A method for wireless communication at a UE, comprising: receiving, in an idle mode, signaling indicating that an SFN will be used for broadcast signaling received concurrently from a plurality of TRPs, the plurality of TRPs comprising a first TRP and a second TRP; and receiving, in the idle mode and via the SFN, the broadcast signaling via a downlink control channel, the broadcast signaling received from the first TRP via a first beam associated with a first SSB and from the second TRP via a second beam associated with a second SSB.

Aspect 2: The method of aspect 1, further comprising: receiving, in the idle mode and via the SFN, the broadcast signaling via a downlink shared channel that is scheduled by the downlink control channel, the broadcast signaling via the downlink shared channel received from the first TRP via the first beam and from the second TRP via the second beam.

Aspect 3: The method of any of aspects 1 through 2, further comprising: receiving signaling indicating that the first SSB is associated with the first TRP and that the second SSB is associated with the second TRP for the broadcast signaling, wherein receiving the downlink control channel from the first TRP via the first beam and from the second TRP via the second beam is based at least in part on the indication of the first SSB and the second SSB.

Aspect 4: The method of aspect 3, wherein the signaling indicates that the first SSB and the second SSB are associated with a control resource set for the broadcast signaling, a search space set for the broadcast signaling, or a monitoring opportunity for the broadcast signaling.

Aspect 5: The method of any of aspects 1 through 2, further comprising: identifying that the first SSB is associated with the first TRP and that the second SSB is associated with the second TRP for the broadcast signaling based at least in part on a mapping rule, wherein receiving the downlink control channel from the first TRP via the first beam and from the second TRP via the second beam is based at least in part on the identifying.

Aspect 6: The method of aspect 5, further comprising: receiving a SIB transmission indicating the mapping rule.

Aspect 7: The method of any of aspects 5 through 6, wherein the mapping rule associates each of a set of one or more monitoring opportunities for the broadcast signaling with a respective pair of SSBs or with a respective SSB.

Aspect 8: The method of aspect 7, wherein the mapping rule indicates that each respective pair of SSBs comprises two SSBs having consecutive index numbers; each respective pair of SSBs comprises two SSBs having index numbers that are offset by two; each respective pair of SSBs comprises two SSBs having index numbers that are offset by a quantity equal to half of a total quantity of index numbers; or each respective pair of SSBs comprises two SSBs on different cells that have a same index number.

Aspect 9: The method of any of aspects 7 through 8, wherein the mapping rule indicates that one pair of SSBs is mapped to each of the set of one or more monitoring opportunities; one pair of SSBs is mapped to each monitoring opportunity in a subset of the set of one or more monitoring opportunities; or one pair of SSBs is mapped to one monitoring opportunity of the set of one or more monitoring opportunities.

Aspect 10: The method of any of aspects 1 through 9, further comprising: transmitting signaling indicating a capability of the UE to use the SFN to receive the broadcast signaling concurrently from the plurality of TRPs, wherein receiving the signaling that indicates to use the SFN is based at least in part on transmitting the signaling indicating the capability of the UE.

Aspect 11: The method of any of aspects 1 through 10, wherein receiving the downlink control channel for the broadcast signaling comprises: receiving, via the downlink control channel, an indication of a first set of one or more reference signal occasions associated with the first TRP and a second set of one or more reference signal occasions associated with the second TRP.

Aspect 12: The method of aspect 11, wherein the first set of one or more reference signal occasions is QCLed with the first SSB based at least in part on being associated with the first TRP and the second set of one or more reference signal occasions is QCLed with the second SSB based at least in part on being associated with the second TRP.

Aspect 13: The method of any of aspects 1 through 10, wherein receiving the downlink control channel for the broadcast signaling comprises: receiving, via the downlink control channel, an indication of a set of one or more reference signal occasions associated with the first TRP, wherein the first TRP is an anchor TRP.

Aspect 14: The method of aspect 13, wherein the set of one or more reference signal occasions is QCLed with the first SSB based at least in part on being associated with the first TRP or based at least in part on the downlink control channel indicating that the set of one or more reference signal occasions is QCLed with the first SSB.

Aspect 15: The method of any of aspects 1 through 14, wherein the downlink control channel comprises a paging indication, a paging early indication, a system information indication, a random access indication, or any combination thereof.

Aspect 16: The method of aspect 15, wherein a downlink shared channel scheduled by the downlink control channel comprises a paging message, a SIB, other system information, a random access message, or any combination thereof.

Aspect 17: The method of any of aspects 1 through 16, wherein the idle mode comprises an RRC idle mode or an RRC inactive mode.

Aspect 18: The method of any of aspects 1 through 17, wherein the first SSB is associated with a first cell and the second SSB is associated with a second cell.

Aspect 19: A method for wireless communication at a first TRP, comprising: transmitting, to a UE in an idle mode, signaling indicating that an SFN will be used for broadcast signaling received concurrently from a plurality of TRPs, the plurality of TRPs comprising the first TRP and a second TRP; and transmitting, to the UE in the idle mode and via the SFN, the broadcast signaling via a downlink control channel, the broadcast signaling transmitted via a first beam associated with a first SSB and transmitted concurrently with a transmission of the downlink control channel from the second TRP via a second beam associated with a second SSB.

Aspect 20: The method of aspect 19, further comprising: transmitting, to the UE in the idle mode and via the SFN, the broadcast signaling via a downlink shared channel that is scheduled by the downlink control channel, the broadcast signaling via the downlink shared channel transmitted from the first TRP via the first beam and transmitted concurrently with a transmission of the downlink shared channel from the second TRP via the second beam.

Aspect 21: The method of any of aspects 19 through 20, further comprising: transmitting signaling indicating that the first SSB is associated with the first TRP and that the second SSB is associated with the second TRP for the broadcast signaling, wherein transmitting the downlink control channel via the first beam is based at least in part on the indication of the first SSB and the second SSB.

Aspect 22: The method of aspect 21, wherein the signaling indicates that the first SSB and the second SSB are associated with a control resource set for the broadcast signaling, a search space set for the broadcast signaling, or a monitoring opportunity for the broadcast signaling.

Aspect 23: The method of any of aspects 19 through 20, further comprising: identifying that the first SSB is associated with the first TRP and that the second SSB is associated with the second TRP for the broadcast signaling based at least in part on a mapping rule, wherein transmitting the downlink control channel via the first beam is based at least in part on the identifying.

Aspect 24: The method of aspect 23, further comprising: transmitting a SIB transmission indicating the mapping rule.

Aspect 25: The method of any of aspects 23 through 24, wherein the mapping rule associates each of a set of one or more monitoring opportunities for the broadcast signaling with a respective pair of SSBs or with a respective SSB.

Aspect 26: The method of aspect 25, wherein the mapping rule indicates that each respective pair of SSBs comprises two SSBs having consecutive index numbers; each respective pair of SSBs comprises two SSBs having index numbers that are offset by two; each respective pair of SSBs comprises two SSBs having index numbers that are offset by a quantity equal to half of a total quantity of index numbers; or each respective pair of SSBs comprises two SSBs on different cells that have a same index number.

Aspect 27: The method of any of aspects 25 through 26, wherein the mapping rule indicates that one pair of SSBs is mapped to each of the set of one or more monitoring opportunities; one pair of SSBs is mapped to each monitoring opportunity in a subset of the set of one or more monitoring opportunities; or one pair of SSBs is mapped to one monitoring opportunity of the set of one or more monitoring opportunities.

Aspect 28: The method of any of aspects 19 through 27, further comprising: receiving signaling indicating a capability of the UE to use the SFN to receive the broadcast signaling concurrently from the plurality of TRPs, wherein transmitting the signaling that indicates to use the SFN is based at least in part on receiving the signaling indicating the capability of the UE.

Aspect 29: The method of any of aspects 19 through 28, wherein transmitting the downlink control channel for the broadcast signaling comprises: transmitting, via the downlink control channel, an indication of a first set of one or more reference signal occasions associated with the first TRP and a second set of one or more reference signal occasions associated with the second TRP.

Aspect 30: The method of aspect 29, wherein the first set of one or more reference signal occasions is QCLed with the first SSB based at least in part on being associated with the first TRP and the second set of one or more reference signal occasions is QCLed with the second SSB based at least in part on being associated with the second TRP.

Aspect 31: The method of any of aspects 19 through 28, wherein transmitting the downlink control channel for the broadcast signaling comprises: transmitting, via the downlink control channel, an indication of a set of one or more reference signal occasions associated with the first TRP, wherein the first TRP is an anchor TRP.

Aspect 32: The method of aspect 31, wherein the set of one or more reference signal occasions is QCLed with the first SSB based at least in part on being associated with the first TRP or based at least in part on the downlink control channel indicating that the set of one or more reference signal occasions is QCLed with the first SSB.

Aspect 33: The method of any of aspects 19 through 32, wherein the downlink control channel comprises a paging indication, a paging early indication, a system information indication, a random access indication, or any combination thereof.

Aspect 34: The method of aspect 33, wherein a downlink shared channel scheduled by the downlink control channel comprises a paging message, a SIB, other system information, a random access message, or any combination thereof.

Aspect 35: The method of any of aspects 19 through 34, wherein the idle mode comprises an RRC idle mode or an RRC inactive mode.

Aspect 36: The method of any of aspects 19 through 35, wherein the first SSB is associated with a first cell and the second SSB is associated with a second cell.

Aspect 37: An apparatus for wireless communication at a UE, comprising a processor; memory coupled with the processor; and instructions stored in the memory and executable by the processor to cause the apparatus to perform a method of any of aspects 1 through 18.

Aspect 38: An apparatus for wireless communication at a UE, comprising at least one means for performing a method of any of aspects 1 through 18.

Aspect 39: A non-transitory computer-readable medium storing code for wireless communication at a UE, the code comprising instructions executable by a processor to perform a method of any of aspects 1 through 18.

Aspect 40: An apparatus for wireless communication at a first TRP, comprising a processor; memory coupled with the processor; and instructions stored in the memory and executable by the processor to cause the apparatus to perform a method of any of aspects 19 through 36.

Aspect 41: An apparatus for wireless communication at a first TRP, comprising at least one means for performing a method of any of aspects 19 through 36.

Aspect 42: A non-transitory computer-readable medium storing code for wireless communication at a first TRP, the code comprising instructions executable by a processor to perform a method of any of aspects 19 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, in a radio resource control (RRC) idle mode or an RRC inactive mode, signaling indicating that a single frequency network will be used for broadcast signaling received concurrently from a plurality of transmission reception points (TRPs), the plurality of TRPs comprising a first TRP and a second TRP; and
   receiving, in the RRC idle mode or the RRC inactive mode and via the single frequency network, the broadcast signaling via a downlink control channel monitoring occasion, wherein the broadcast signaling is received from the first TRP via a first beam associated with a first synchronization signal block (SSB) and from the second TRP via a second beam associated with a second SSB, wherein the first SSB and the second SSB are each associated with the downlink control channel monitoring occasion, wherein association of the first SSB and the second SSB with the downlink control channel monitoring occasion is through control signaling from at least one of the plurality of TRPs or a mapping rule.

2. The method of claim 1, further comprising:
receiving signaling indicating that the first SSB is associated with the first TRP and that the second SSB is associated with the second TRP for the broadcast signaling, wherein receiving the broadcast signaling via the downlink control channel monitoring occasion from the first TRP via the first beam and from the second TRP via the second beam is based at least in part on the signaling indicating that the first SSB is associated with the first TRP and that the second SSB is associated with the second TRP.

3. The method of claim 2, wherein the signaling indicates that the first SSB and the second SSB are associated with a control resource set for the broadcast signaling, a search space set for the broadcast signaling, or a monitoring opportunity for the broadcast signaling.

4. The method of claim 1, further comprising:
transmitting signaling indicating a capability of the UE to use the single frequency network to receive the broadcast signaling concurrently from the plurality of TRPs, wherein receiving the signaling indicating that the single frequency network will be used for broadcast signaling is based at least in part on transmitting the signaling indicating the capability of the UE.

5. The method of claim 1, wherein the broadcast signaling comprises a paging indication, a paging early indication, a system information indication, a random access indication, or any combination thereof.

6. The method of claim 5, wherein a downlink shared channel scheduled by the broadcast signaling comprises a paging message, a system information block, other system information, a random access message, or any combination thereof.

7. The method of claim 1, wherein receiving the broadcast signaling via the downlink control channel monitoring occasion comprises:
receiving the broadcast signaling via a control resource set associated with a common search space.

8. The method of claim 1, further comprising:
receiving, in the RRC idle mode or the RRC inactive mode and via the single frequency network, second broadcast signaling via a downlink shared channel that is scheduled by the broadcast signaling, wherein the broadcast signaling is received from the first TRP via the first beam and from the second TRP via the second beam.

9. The method of claim 1, further comprising:
identifying that the first SSB is associated with the first TRP and that the second SSB is associated with the second TRP for the broadcast signaling based at least in part on the mapping rule, wherein receiving the broadcast signaling via the downlink control channel monitoring occasion from the first TRP via the first beam and from the second TRP via the second beam is based at least in part on the identifying.

10. The method of claim 9, further comprising:
receiving a system information block transmission indicating the mapping rule.

11. The method of claim 9, wherein the mapping rule associates each of a set of monitoring opportunities for the broadcast signaling with a respective pair of SSBs or with a respective SSB.

12. The method of claim 11, wherein the mapping rule indicates that:
each respective pair of SSBs comprises two SSBs having consecutive index numbers;
each respective pair of SSBs comprises two SSBs having index numbers that are offset by two;
each respective pair of SSBs comprises two SSBs having index numbers that are offset by a quantity equal to half of a total quantity of index numbers; or
each respective pair of SSBs comprises two SSBs on different cells that have a same index number.

13. The method of claim 11, wherein the mapping rule indicates that:
one pair of SSBs is mapped to each of the set of monitoring opportunities;
one pair of SSBs is mapped to each monitoring opportunity in a subset of the set of monitoring opportunities; or
one pair of SSBs is mapped to one monitoring opportunity of the set of monitoring opportunities.

14. The method of claim 1, wherein receiving the broadcast signaling comprises:
receiving, via the downlink control channel monitoring occasion, an indication of a set of reference signal occasions associated with the first TRP, wherein the first TRP is an anchor TRP.

15. The method of claim 14, wherein the set of reference signal occasions is quasi co-located with the first synchronization signal block based at least in part on being associated with the first TRP or based at least in part on the broadcast signaling indicating that the set of reference signal occasions is quasi co-located with the first synchronization signal block.

16. The method of claim 1, wherein the first SSB is associated with a first cell and the second SSB is associated with a second cell.

17. A method for wireless communication at a first transmission reception point (TRP), comprising:
transmitting, to a user equipment (UE) while the UE is in a radio resource control (RRC) idle mode or an RRC inactive mode, signaling indicating that a single frequency network will be used for broadcast signaling received concurrently from a plurality of TRPs, the plurality of TRPs comprising the first TRP and a second TRP; and
transmitting, to the UE while the UE is in the RRC idle mode or the RRC inactive mode and via the single frequency network, the broadcast signaling via a downlink control channel monitoring occasion, wherein the broadcast signaling transmitted via a first beam associated with a first synchronization signal block (SSB) and transmitted concurrently with a transmission of the broadcast signaling from the second TRP via a second beam associated with a second SSB, wherein the first SSB and the second SSB are each associated with the downlink control channel monitoring occasion, wherein association of the first SSB and the second SSB with the downlink control channel monitoring occasion is through control signaling from at least one of the plurality of TRPs or a mapping rule.

18. The method of claim 17, further comprising:
transmitting signaling indicating that the first SSB is associated with the first TRP and that the second SSB is associated with the second TRP for the broadcast signaling, wherein transmitting the broadcast signaling via the downlink control channel monitoring occasion via the first beam is based at least in part on the signaling indicating that the first SSB is associated with the first TRP and that the second SSB is associated with the second TRP.

19. The method of claim 18, wherein the signaling indicates that the first SSB and the second SSB are associated with a control resource set for the broadcast signaling, a search space set for the broadcast signaling, or a monitoring opportunity for the broadcast signaling.

20. The method of claim 17, further comprising:
receiving signaling indicating a capability of the UE to use the single frequency network to receive the broadcast signaling concurrently from the plurality of TRPs, wherein transmitting the signaling indicating that the single frequency network will be used for broadcast signaling is based at least in part on receiving the signaling indicating the capability of the UE.

21. The method of claim 17, wherein the broadcast signaling comprises a paging indication, a paging early indication, a system information indication, a random access indication, or any combination thereof.

22. The method of claim 21, wherein a downlink shared channel scheduled by the broadcast signaling comprises a paging message, a system information block, other system information, a random access message, or any combination thereof.

23. The method of claim 17, further comprising:
transmitting, to the UE while the UE is in the RRC idle mode or the RRC inactive mode and via the single frequency network, second broadcast signaling via a downlink shared channel that is scheduled by the broadcast signaling, wherein the broadcast signaling via the downlink shared channel is transmitted from the first TRP via the first beam and transmitted concurrently with a transmission of the downlink shared channel from the second TRP via the second beam.

24. The method of claim 17, further comprising:
identifying that the first SSB is associated with the first TRP and that the second SSB is associated with the second TRP for the broadcast signaling based at least in part on the mapping rule, wherein transmitting the broadcast signaling via the downlink control channel monitoring occasion via the first beam is based at least in part on the identifying.

25. The method of claim 24, further comprising:
transmitting a system information block transmission indicating the mapping rule.

26. The method of claim 24, wherein the mapping rule associates each of a set of one or more monitoring opportunities for the broadcast signaling with a respective pair of SSBs or with a respective SSB.

27. The method of claim 17, wherein the broadcast signaling comprises:
transmitting, via the downlink control channel monitoring occasion, an indication of a set of one or more reference signal occasions associated with the first point TRP, wherein the first TRP is an anchor TRP.

28. The method of claim 17, wherein transmitting the broadcast signaling via the downlink control channel monitoring occasion comprises:
transmitting the broadcast signaling via a control resource set associated with a common search space.

29. An apparatus for wireless communication, comprising:
one or more processors;
one or more memories coupled with the one or more processors; and
instructions stored in the one or more memories and executable by the one or more processors to cause the apparatus to:
receive, in a radio resource control (RRC) idle mode or an RRC inactive mode, signaling indicating that a single frequency network will be used for broadcast signaling received concurrently from a plurality of transmission reception points (TRPs), the plurality of TRPs comprising a first TRP and a second TRP; and
receive, in the RRC idle mode or the RRC inactive mode and via the single frequency network, the broadcast signaling via a downlink control channel monitoring occasion, wherein the broadcast signaling is received from the first TRP via a first beam associated with a first synchronization signal block (SSB) and from the second TRP via a second beam associated with a second SSB, wherein the first SSB and the second SSB are each associated with the downlink control channel monitoring occasion, wherein association of the first SSB and the second SSB with the downlink control channel monitoring occasion is through control signaling from at least one of the plurality of TRPs or a mapping rule.

30. An apparatus for wireless communication, comprising:
one or more processors;
one or more memories coupled with the one or more processors; and
instructions stored in the one or more memories and executable by the one or more processors to cause the apparatus to:
transmit, from a first transmission reception point (TRP) to a user equipment (UE) while the UE is in a radio resource control (RRC) idle mode or an RRC inactive mode, signaling indicating that a single frequency network will be used for broadcast signaling received concurrently from a plurality of TRPs, the plurality of TRPs comprising the first TRP and a second TRP; and
transmit, to the UE while the UE is in the RRC idle mode or the RRC inactive mode and via the single frequency network, the broadcast signaling via a downlink control channel monitoring occasion, wherein the broadcast signaling is transmitted via a first beam associated with a first synchronization signal block (SSB) and is transmitted concurrently with a transmission of the broadcast signaling from the second TRP via a second beam associated with a second SSB, wherein the first SSB and the second SSB are each associated with the downlink control channel monitoring occasion, wherein association of the first SSB and the second SSB with the downlink control channel monitoring occasion is through control signaling from at least one of the plurality of TRPs or a mapping rule.

* * * * *